(12) United States Patent
Shimokawa et al.

(10) Patent No.: US 12,438,712 B2
(45) Date of Patent: Oct. 7, 2025

(54) ENCRYPTION PROCESSING APPARATUS, ENCRYPTION PROCESSING METHOD FOR ENCRYPTION PROCESSING APPARATUS, AND STORAGE MEDIUM

(71) Applicant: CANON KABUSHIKI KAISHA, Tokyo (JP)

(72) Inventors: Yoshihiko Shimokawa, Kanagawa (JP); Akiyoshi Momoi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 237 days.

(21) Appl. No.: 18/478,819

(22) Filed: Sep. 29, 2023

(65) Prior Publication Data

US 2024/0113871 A1 Apr. 4, 2024

(30) Foreign Application Priority Data

Oct. 3, 2022 (JP) .................. 2022-159284

(51) Int. Cl.
*H04L 9/08* (2006.01)
*H04L 9/06* (2006.01)

(52) U.S. Cl.
CPC .......... *H04L 9/0869* (2013.01); *H04L 9/0618* (2013.01)

(58) Field of Classification Search
CPC ... H04L 9/0869; H04L 9/0618; H04L 9/0631; H04L 9/003; H04L 9/0625; H04L 9/40;

(Continued)

(56) References Cited

U.S. PATENT DOCUMENTS 9,628,265 B2 * 4/2017 Wang .................. H04L 9/0618
2007/0071235 A1 3/2007 Fujisaki
(Continued)

FOREIGN PATENT DOCUMENTS

EP 1833190 A1 9/2007
JP 2007006184 A 1/2007
(Continued)

OTHER PUBLICATIONS

Paul Kocher, et al., Introduction to Differential Power Analysis, Journal of Cryptographic Engineering Apr. 2011, vol. 1, Issue 1.
(Continued)

*Primary Examiner* — Quazi Farooqui
(74) *Attorney, Agent, or Firm* — Canon U.S.A., Inc. IP Division

(57) ABSTRACT

An encryption processing apparatus includes a table generation unit configured to generate a masked non-linear transformation table using a random number as a mask value, a storage unit configured to store the mask value and the masked non-linear transformation table, a first selection unit configured to select, from among the mask value and the masked non-linear transformation table that are stored in the storage unit, one set of a mask value and a masked non-linear transformation table that are to be rewritten, an operation unit configured to perform an operation using the mask value and the masked non-linear transformation table, and a second selection unit configured to select, from among the mask value and the masked non-linear transformation table that are stored in the storage unit, the mask value and the masked non-linear transformation table that are to be used by the operation unit.

14 Claims, 15 Drawing Sheets

(58) Field of Classification Search
CPC .......... H04L 63/0435; H04L 2209/043; H04L 2209/046; H04L 2209/08; H04L 2209/24; H04L 9/08
See application file for complete search history.

(56) References Cited

U.S. PATENT DOCUMENTS

2013/0077790 A1* 3/2013 Kawabata ............. H04L 9/0631
380/28
2018/0062828 A1 3/2018 Cioranesco

FOREIGN PATENT DOCUMENTS

JP          6365076 B2    8/2018
WO    2006/112114 A1    10/2006

OTHER PUBLICATIONS

Thomas S. Messerges, Securing the AES Finalists Against Power Analysis Attacks, Fast Software Encryption Workshop 2000, 2001.

* cited by examiner

FIG. 8

| ROUND | MASK VALUE BYTE POSITIONS AFTER REARRANGEMENT | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| 1 | m8 | m2 | m10 | m5 | m12 | m6 | m0 | m3 | m14 | m7 | m13 | m1 | m11 | m4 | m15 | m9 |
| 2 | m10 | m9 | m8 | m0 | m3 | m5 | m14 | m1 | m4 | m15 | m2 | m13 | m6 | m12 | m11 | m7 |
| 3 | m2 | m0 | m14 | m13 | m5 | m15 | m6 | m9 | m1 | m12 | m8 | m7 | m10 | m11 | m3 | m4 |
| ... | ... | ... | ... | ... | ... | ... | ... | ... | ... | ... | ... | ... | ... | ... | ... | ... |
| 10 | m13 | m1 | m15 | m12 | m6 | m11 | m7 | m4 | m10 | m9 | m5 | m0 | m3 | m14 | m8 | m2 |

ENCRYPTION PROCESSING APPARATUS, ENCRYPTION PROCESSING METHOD FOR ENCRYPTION PROCESSING APPARATUS, AND STORAGE MEDIUM

BACKGROUND OF THE DISCLOSURE

Field of the Disclosure

The present disclosure relates to an encryption processing apparatus, an encryption processing method for the encryption processing apparatus, and a storage medium. In particular, a non-transitory storage medium storing a program comprising instructions which cause the encryption processing apparatus to execute an encryption processing method.

Description of the Related Art

In encryption techniques, cryptographic keys are important information. In symmetric key encryption, such as AES (Advanced Encryption Standard) (Federal Information Processing Standards (FIPS) 197), a symmetric cryptographic key is used in both encryption and decryption. If the cryptographic key is leaked, a third party can decrypt a ciphertext using the leaked cryptographic key and obtain plaintext information that has been encrypted to be protected from the third party. Thus, in order to maintain safety of encryption, it is necessary to ensure that confidential information, such as a cryptographic key, cannot be easily inferred.

Meanwhile, attack methods known as side-channel attacks (Paul Kocher, Joshua Jaffe, Benjamin Jun, "Introduction to Differential Power Analysis", Journal of Cryptographic Engineering April 2011, Volume 1, Issue 1, pp 5-27) to steal a cryptographic key have been discussed. In the attacks, a cryptographic key being used in encryption processing is estimated by observation of side-channel information, such as power consumption and electromagnetic waves produced by encryption modules during encryption operations, and statistical processing of the side-channel information. Among the side-channel attacks, differential power analysis (DPA) is especially known as a strong attack method. In DPA, correlations between an estimation key obtained by estimation, inputs to and outputs from an encryption processing apparatus, and side-channel information acquired by observation are used to acquire a plurality of pieces of data, and a key is identified by statistical processing using the plurality of acquired pieces of data.

A masking method (Thomas S. Messerges, "Securing the AES Finalists Against Power Analysis Attacks," in proceedings of Fast Software Encryption Workshop 2000, Springer-Verlag, pp. 150-164, 2001) has been discussed as a countermeasure against side-channel attacks including DPA. In the masking method, an exclusive logical OR between a plaintext and a random number serving as a mask value is performed to obtain a random value to be used as a masked intermediate value, and an encryption operation is performed. Since it is difficult to calculate a non-linear transformation of a masked intermediate value, a masked non-linear transformation table that is a transformation table factoring in the mask is often used in the encryption operation. The masked non-linear transformation table is a table that uses the masked intermediate value as input and outputs a value obtained by applying the mask to a value obtained as a result of non-linear transformation on the original intermediate value, and the masked non-linear transformation table differs for each mask value. In the masking method, the intermediate value is constantly masked, whereby correlations between data and side-channel information are concealed. Thus, the masking method is resistant to side-channel attacks.

The masking method has an issue that the processing speed may decrease because a large number of operations are performed to dynamically generate a masked non-linear transformation table from a new mask value. Several methods are discussed in an attempt to overcome this issue.

WO 2006/112114 discusses a method that uses the same mask value for each byte portion of data in each round. In this method, the mask value to be used in each round is limited to one mask value to reduce the number of masked non-linear transformation tables to be used, compared to a case where a plurality of mask values is used, whereby the processing speed improves.

Japanese Patent Application Laid-Open No. 2007-6184 discusses a method that generates a masked non-linear transformation table only in a case where a data value generation instruction is input. With this method, the processing speed improves compared to a case where a masked non-linear transformation table is generated each time encryption processing is performed.

Japanese Patent No. 6365076 discusses a method in which a selection unit is included and a plurality of fixed mask values prepared in advance based on a random number is randomly rearranged for use in masking. This method excludes masked non-linear transformation tables that are not used in the table generation and the encryption operation, whereby the processing speed are improved and the circuit size is reduced.

The conventional methods still have several issues. In the method discussed in WO 2006/112114 and the method discussed in Japanese Patent Application Laid-Open No. 2007-6184, the encryption operation and the masked non-linear transformation table generation are processed sequentially, which may improve the processing speed to some extent. However, the methods have the issue that the processing speed decreases compared to a case where no countermeasures against side-channel attacks are implemented. Further, in the method discussed in WO 2006/112114, because the same mask value is used for each byte portion of data within the same round, the method has the issue that the resistance to side-channel attacks decreases.

In the method discussed in Japanese Patent No. 6365076, each mask value applied to a portion of data is changed for each round, but the types of mask values and masked non-linear transformation tables for use are still limited. Thus, the method has the issue that the resistance to side-channel attacks decreases.

SUMMARY OF THE DISCLOSURE

The present disclosure is directed to improving resistance to side-channel attacks without causing a decrease in processing speed while an increase in circuit size is minimized.

According to an aspect of the present disclosure, an encryption processing apparatus includes a random number generation unit configured to generate a random number, a table generation unit configured to generate a masked non-linear transformation table using the random number as a mask value, a storage unit configured to store the mask value and the masked non-linear transformation table, a first selection unit configured to select, from among the mask value and the masked non-linear transformation table that are stored in the storage unit, one set of a mask value and a masked non-linear transformation table that are to be rewritten, an operation unit configured to perform an operation using the mask value and the masked non-linear transformation table, and a second selection unit configured to select, from among the mask value and the masked non-linear transformation table that are stored in the storage unit, the mask value and the masked non-linear transformation table that are to be used by the operation unit, wherein the storage unit stores one or more the mask values in addition to a number of the mask values to be used by the operation unit and stores one or more the masked non-linear transformation tables in addition to a number of masked non-linear transformation tables to be used by the operation unit, wherein the mask value and the masked non-linear transformation table that the first selection unit selects and the mask value and the masked non-linear transformation table that the second selection unit selects are different from each other, wherein the generation of the masked non-linear transformation table by the table generation unit and the operation by the operation unit are processed concurrently, and wherein, after completion of the rewriting of the storage unit, the first selection unit and the second selection unit select the mask value and the masked non-linear transformation table that are different from the rewritten mask value and the rewritten masked non-linear transformation table.

Further features of the present disclosure will become apparent from the following description of exemplary embodiments with reference to the attached drawings.

BRIEF DESCRIPTION OF THE DRAWINGS

FIG. 8 is a diagram illustrating an example of different mask value rearrangements for respective rounds.

DESCRIPTION OF THE EMBODIMENTS

Various exemplary embodiments will be described below with reference to the drawings. It should be noted that the exemplary embodiments described below are mere examples and applicable encryption processing apparatuses are not limited to encryption processing apparatuses that use Advanced Encryption Standard (AES). For example, the present disclosure is widely applicable to encryption processing apparatuses that perform non-linear transformation by referring to a table in block cipher processing, such as the Data Encryption Standard (DES) or the ShangMi 4 (SM4) among encryption algorithms.

A first exemplary embodiment will be described below with reference to the drawings. First, an overview of AES encryption processing will be described below. While a case where an AES key length is 128 bits will be described below, any of the key lengths of 128, 192, and 256 bits supported by AES can be used.

Figure 1:
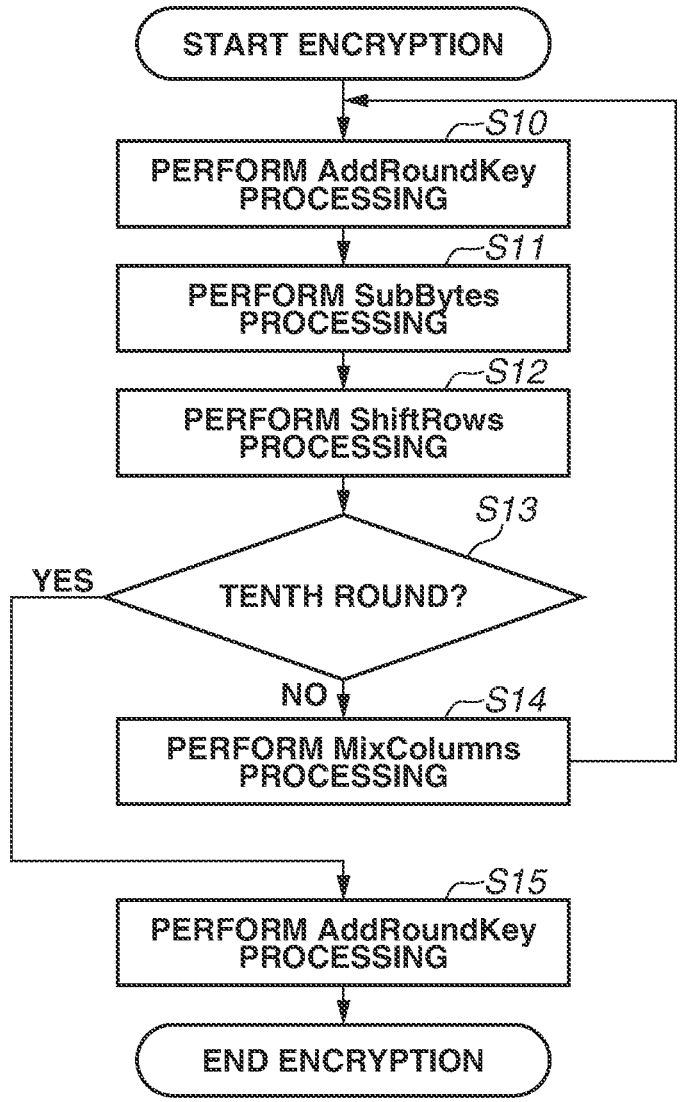
FIG. 1 is a flowchart illustrating an Advanced Encryption Standard (AES) encryption process defined in the Federal Information Processing Standards (FIPS).
Figure 2:
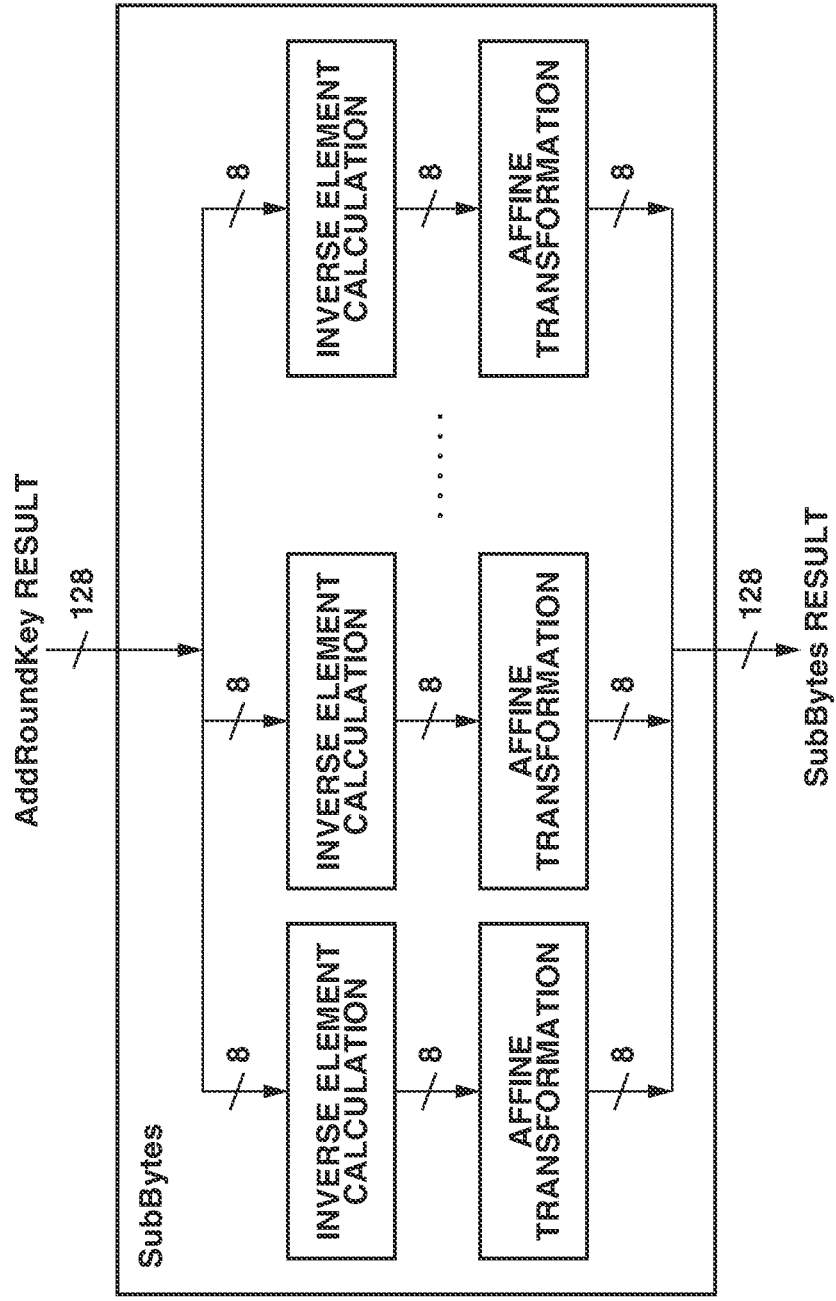
FIG. 2 is a diagram illustrating SubBytes.
Figure 3:
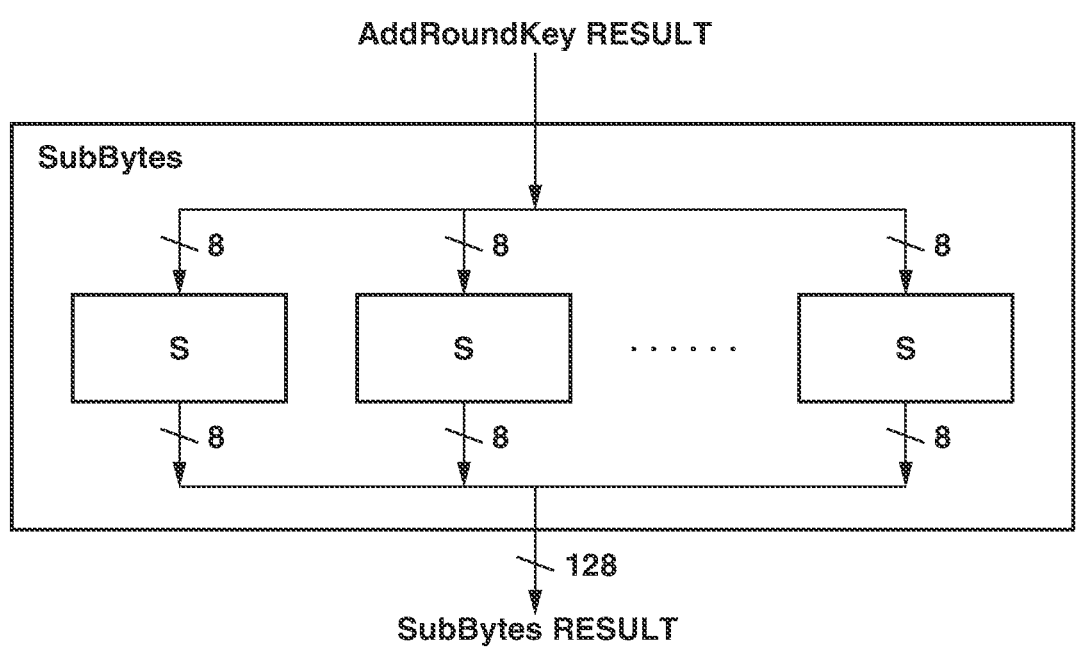
FIG. 3 is a diagram illustrating SubBytes implemented using a table.

FIG. 1 is a flowchart illustrating an AES encryption process defined in the Federal Information Processing Standards (FIPS). AddRoundKey processing, SubBytes processing, ShiftRows processing, and MixColumns processing in FIG. 1 correspond to those of the same names that are defined as sub-block operations in "FIPS 197". AddRoundKey processing calculates an exclusive logical OR between each bit of a 128-bit round key generated from a cryptographic key and each bit of 128-bit input data. SubBytes processing divides the AddRoundKey processing result into groups of 8 bits and performs an inverse element calculation, which is a non-linear transformation, and an Affine transformation, which is a linear transformation, as illustrated in FIG. 2. In general, SubBytes processing is performed often using table transformation with a non-linear transformation table, as illustrated in FIG. 3. The non-linear transformation table is a table indicating a correspondence relationship between input 8 bits and output 8 bits and consists of 8 bits×256 elements. ShiftRows processing divides the 128-bit SubBytes processing result into groups of 8 bits and performs a byte transposition on the groups. MixColumns processing divides the ShiftRows processing result into groups of 32 bits and performs a matrix operation on the groups.

In a case where the encryption is started, first, in step S10, AddRoundKey processing is performed.

Then, in step S11, SubBytes processing is performed based on the AddRoundKey processing result. Next, in step S12, ShiftRows processing is performed. Then, in step S13, the AES round is determined. As a result of the determination, in a case where the AES round is the first to ninth round (NO in step S13), the processing proceeds to step S14. In step S14, MixColumns processing is performed, and then the processing returns to step S10. On the other hand, in step S13, in a case where the AES round is the tenth round (YES in step S13), the processing proceeds to step S15. In step S15, AddRoundKey processing is performed, and the AddRoundKey processing result is used as a ciphertext. Then, the encryption is ended.

Figure 4:
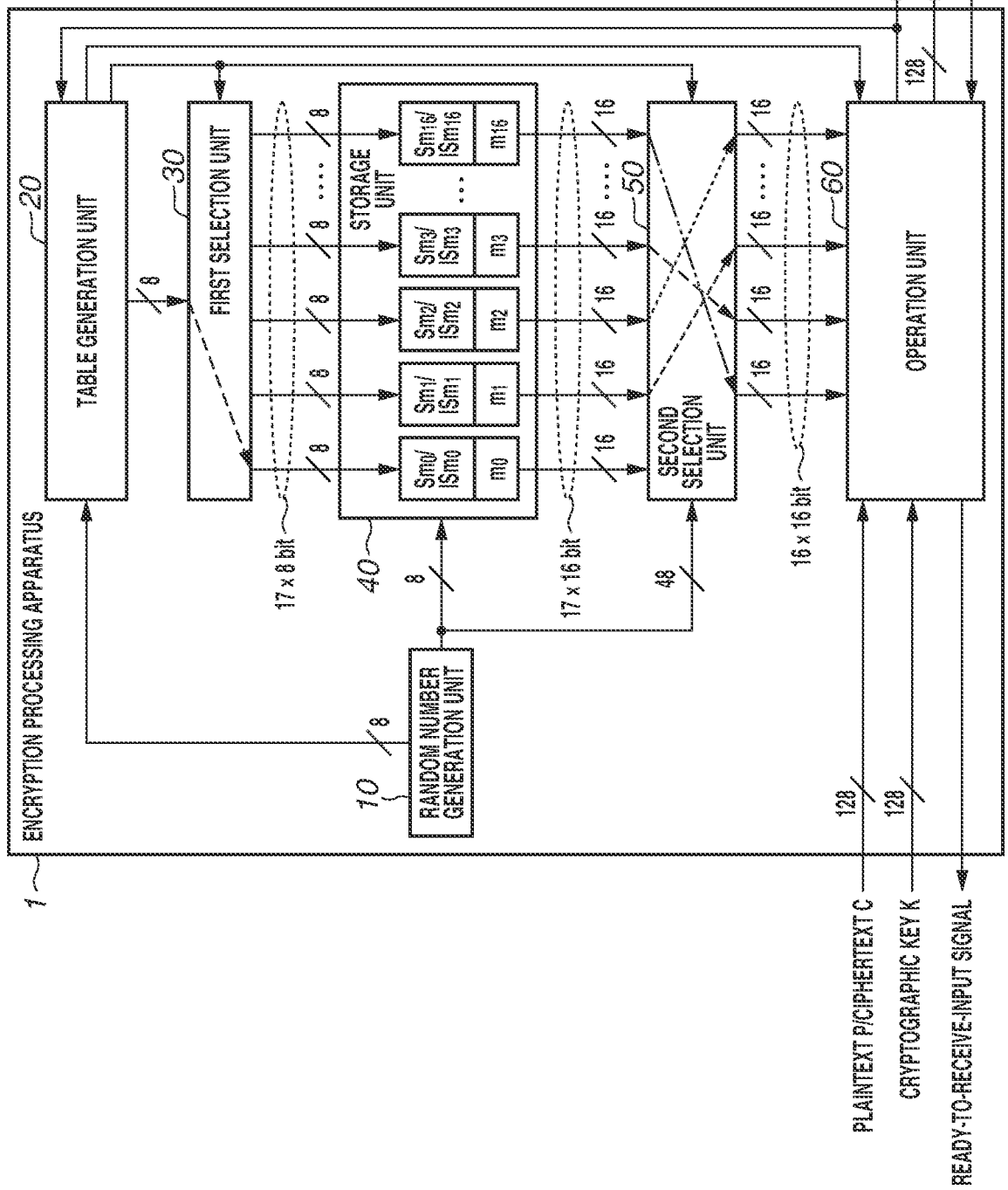
FIG. 4 is a diagram illustrating an example of a configuration of an encryption processing apparatus.

FIG. 4 is a diagram illustrating an example of a configuration of an encryption processing apparatus 1 according to the present exemplary embodiment. The encryption processing apparatus 1 includes a random number generation unit 10, a table generation unit 20, a first selection unit 30, a storage unit 40, a second selection unit 50, and an operation unit 60. The encryption processing apparatus 1 outputs a ciphertext C based on an input plaintext P and a cryptographic key K. A plaintext P is input only in a case where a ready-to-receive-input signal is output from the encryption processing apparatus 1.

A standard processing procedure of encryption processing in the encryption processing apparatus 1 will be described below. The encryption processing includes three processes that are pre-processing, which is performed at the activation time of the encryption processing apparatus 1, encryption processing, and masked non-linear transformation table generation processing. The encryption processing and the masked non-linear transformation table generation processing are performed concurrently after completion of the pre-processing.

Pre-Processing

A processing procedure of the pre-processing in the encryption processing apparatus 1 will be described below. In the pre-processing, the number of mask values and the number of masked non-linear transformation tables both of which are to be used by the operation unit 60 are generated, and the generated mask values and the generated masked non-linear transformation tables are stored in the storage unit 40. For example, in AES, sixteen mask values and sixteen masked non-linear transformation tables are generated.

First, the random number generation unit 10 generates an 8-bit random number r and inputs the generated random number r as a mask value to the table generation unit 20. The table generation unit 20 holds an initial non-linear transformation table generated by tabulating SubBytes input/output results defined in "FIPS 197". The table generation unit 20 generates array data Sm[0], Sm[255] of a masked non-linear transformation table as specified below, based on the mask value and array data S[0], . . . , S[255] of the initial non-linear transformation table. The symbol "+" herein denotes XOR.

$$Sm[x]=S[x+r]+r \ (x=0,1,\ldots,255).$$

The generated mask value and the generated masked non-linear transformation table are output to the first selection unit 30 and are stored in the storage unit 40 via the first selection unit 30. The table generation unit 20 generates an index value i indicating a number for a mask value and a masked non-linear transformation table that are stored in the storage unit 40, and outputs the generated index value i to the first selection unit 30 and the second selection unit 50. As illustrated in FIG. 4, the first selection unit 30 selects one set from among seventeen sets of mask values mi (i=0, . . . , 16) and masked non-linear transformation tables Smi that are stored in the storage unit 40. The first selection unit 30 receives the index value i output from the table generation unit 20 and selects the ith mask value and the ith masked non-linear transformation table. At the time of starting the pre-processing, the table generation unit 20 outputs an index value that is i=0, and thus, the first selection unit 30 selects $m_0$ and $Sm_0$. After completion of the rewriting of the selected mask value $m_0$ and the selected masked non-linear transformation table $Sm_0$, the table generation unit 20 outputs the index value that is i=i+1=0+1=1 to the first selection unit 30 and starts generating a next masked non-linear transformation table. Then, the first selection unit 30 receives the index value i=1 and selects the first mask value $m_1$ and the first masked non-linear transformation table $Sm_1$. The table generation unit 20 generates a masked non-linear transformation table by a similar process using an 8-bit random number r generated by the random number generation unit 10 as a mask value, and a mask value and a masked non-linear transformation table that are selected by the first selection unit 30 are rewritten. The foregoing operations are repeated, and sixteen mask values and sixteen masked non-linear transformation tables that are to be used by the operation unit 60 in AES encryption operations are stored in the storage unit 40. Then, the table generation unit 20 sets i=i+1=16 and then outputs a pre-processing completion signal to the operation unit 60, and the pre-processing is completed. Specifically, the mask values $m_0, \ldots m_{15}$ and the masked non-linear transformation tables $Sm_0, \ldots, Sm_{15}$ are sequentially stored in the storage unit 40, and the pre-processing is completed.

Masked Non-Linear Transformation Table Generation Processing

A processing procedure of the masked non-linear transformation table generation processing in the encryption processing apparatus 1 will be described below. The masked non-linear transformation table generation processing is performed after completion of the pre-processing, and is processed concurrently with the encryption processing.

After completion of the pre-processing, as in the pre-processing, the table generation unit 20 generates a new masked non-linear transformation table using an 8-bit random number r generated by the random number generation unit 10 as a mask value. Immediately after completion of the pre-processing, the index value is i=16, and thus, the first selection unit 30 selects the sixteenth mask value $m_{16}$ and the sixteenth masked non-linear transformation table $Sm_{16}$. In a case where the rewriting of the mask value $m_{16}$ and the masked non-linear transformation table $Sm_{16}$ is completed and an operation completion signal is received from the operation unit 60, the table generation unit 20 changes i to i=(i+1) mod 17 (where a mod b represents the remainder of a divided by b) and outputs the changed i.

Then, the generation of a new mask value and a new masked non-linear transformation table is started. The table generation unit 20 generates a masked non-linear transformation table using an 8-bit random number r generated by the random number generation unit 10 as a mask value. The first selection unit 30 selects the mask value $m_i$ and the masked non-linear transformation table $Sm_i$ based on the index value i output from the table generation unit 20. In a case where the rewriting of the mask value $m_i$ and the masked non-linear transformation table $Sm_i$ is completed and an operation completion signal from the operation unit 60 is received, the table generation unit 20 changes the index value i to i=(i+1) mod 17.

Specifically, immediately after completion of the pre-processing, the index value is i=16, and thus, the first selection unit 30 selects the mask value $m_{16}$ and the masked non-linear transformation table $Sm_{16}$. After completion of the rewriting of the masked non-linear transformation table $Sm_{16}$, the index value i is changed to 0, and thus, the first selection unit 30 selects the mask value $m_0$ and the masked non-linear transformation table $Sm_0$, and the table generation unit 20 starts the masked non-linear transformation table generation. By repeating the foregoing operations, the mask values and the masked non-linear transformation tables are rewritten sequentially, and the more the encryption processing is performed, the more the types of mask values and masked non-linear transformation tables to be used by the operation unit 60 increase.

Encryption Processing

Next, a processing procedure of the encryption processing in the encryption processing apparatus 1 will be described below. The encryption processing is performed after completion of the pre-processing, and is processed concurrently with the masked non-linear transformation table generation processing. In the encryption processing, the operation unit 60 outputs a ciphertext C from an input plaintext P, a cryptographic key K, and a mask value and a masked non-linear transformation table that are stored in the storage unit 40. The mask value and the masked non-linear transformation table are input from the storage unit 40 to the operation unit 60 via the second selection unit 50.

Figure 5:
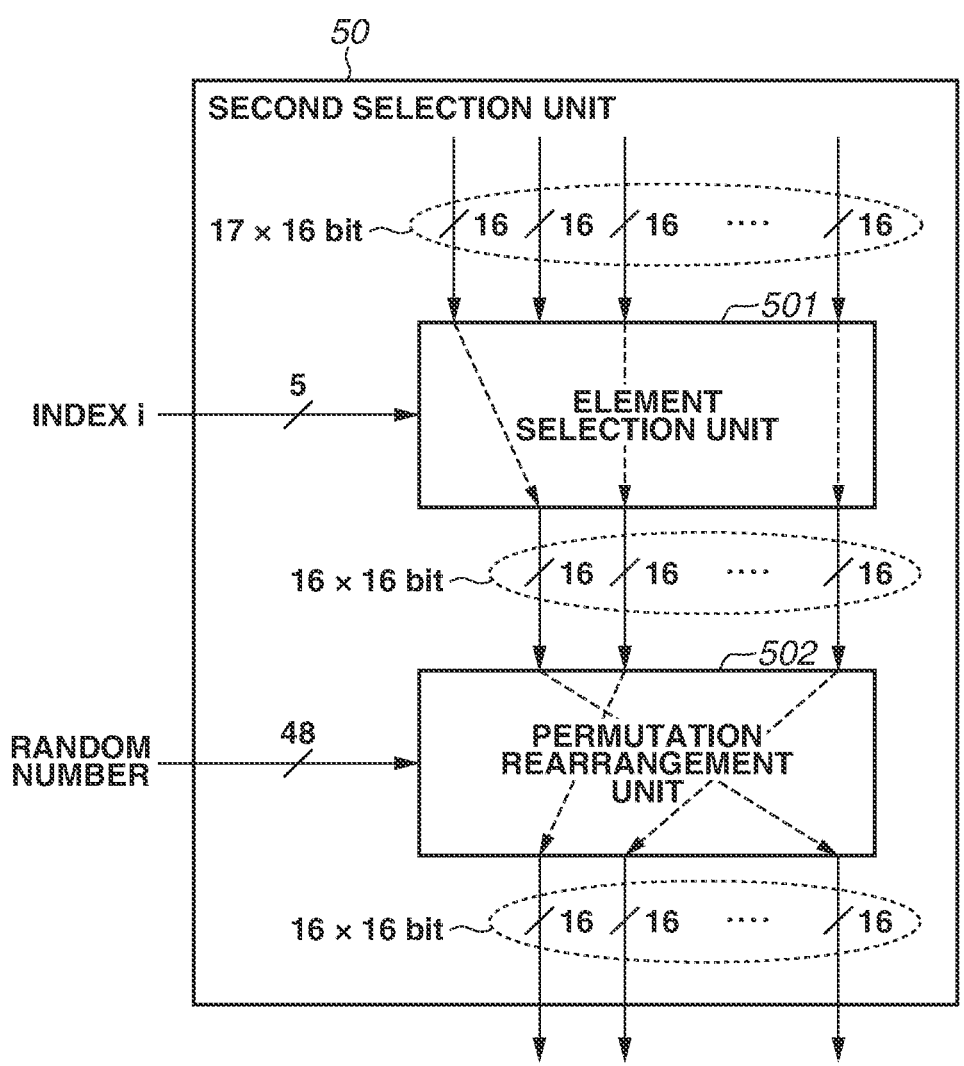
FIG. 5 is a diagram illustrating an example of a configuration of a second selection unit.

As illustrated in FIG. 5, the second selection unit 50 includes an element selection unit 501 and a permutation rearrangement unit 502. The element selection unit 501 selects, from among the seventeen sets of mask values and masked non-linear transformation tables that are input from the storage unit 40, sixteen sets of mask values and masked non-linear transformation tables other than the ith mask value and the ith masked non-linear transformation table being rewritten based on the index value i from the table generation unit 20. Immediately after completion of the pre-processing, the index value is i=16, and thus, sixteen sets of mask values $m_0, \ldots, m_{15}$ and masked non-linear transformation tables $Sm_0, \ldots, Sm_{15}$ are selected.

Figure 6:
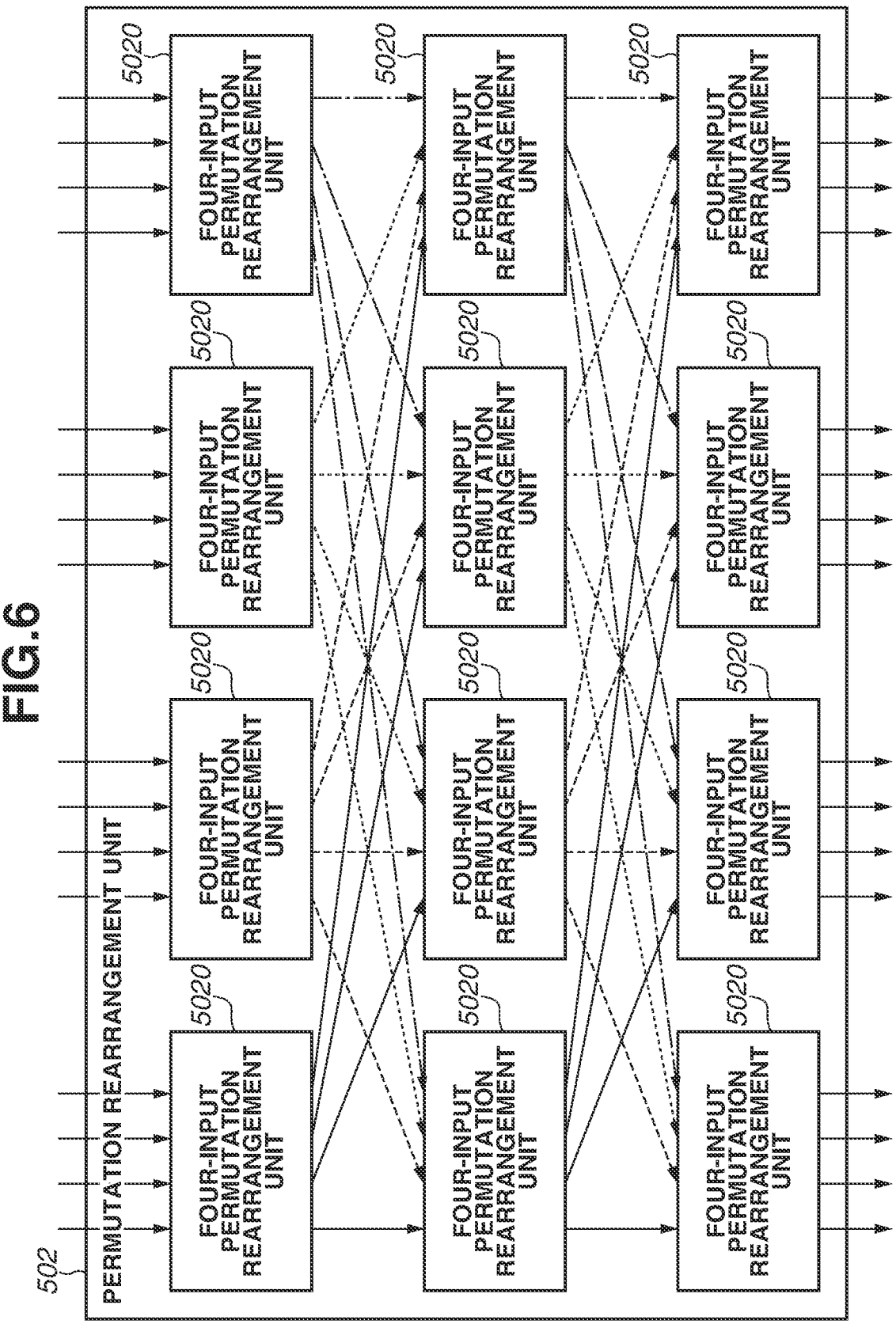
FIG. 6 is a diagram illustrating an example of a configuration of a permutation rearrangement unit.
Figure 7:
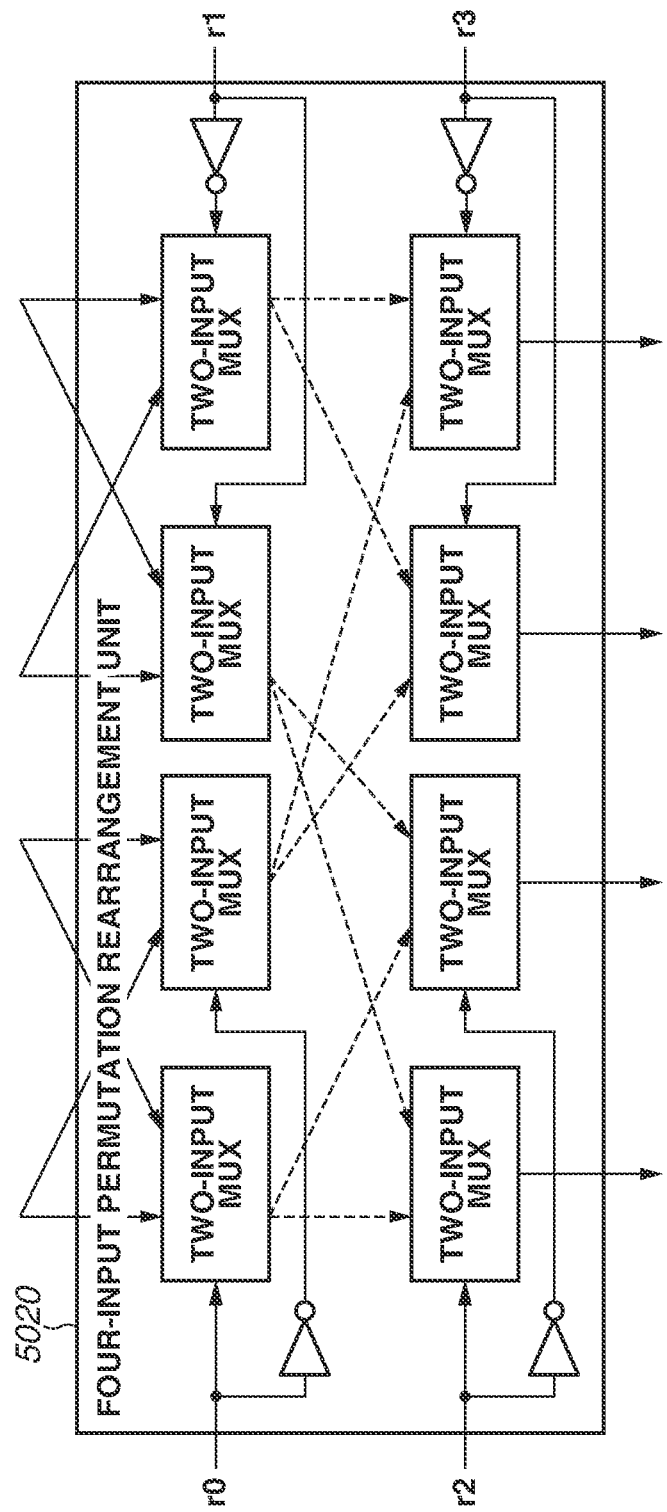
FIG. 7 is a diagram illustrating an example of a configuration of a four-input permutation rearrangement unit.

Then, the permutation rearrangement unit 502 rearranges the mask values and the masked non-linear transformation tables randomly for each round, based on the 48-bit random number input from the random number generation unit 10 and outputs the rearranged mask values and the rearranged masked non-linear transformation tables to the operation unit 60. As illustrated in FIG. 6, the permutation rearrangement unit 502 includes twelve four-input permutation rearrangement units 5020. Each of the four-input permutation rearrangement units 5020 has a configuration as illustrated in FIG. 7. Each of the four-input permutation rearrangement units 5020 includes eight two-input MUXes and performs permutation rearrangement using a total of four bits of 1-bit random numbers r0, r1, r2, and r3. Each of the random numbers r0 to r3 is input as a selection signal to two different pieces of the two-input MUXes. In this processing, each random number is directly input to one of the two two-input MUXes while a value obtained by performing bit inversion on the random number is input to the other one of the two pieces of two-input MUX. Each of the two-input MUXes selects one of the two inputs based on the random number and outputs the selected one, and since the values having their bits flipped in relation to each other are input as selection signals to the two different two-input MUXes, the two different two-input MUXes output different mask values.

By the foregoing operations, each of the four-input permutation rearrangement units 5020 performs permutation rearrangement on the four inputs. A 16-byte mask value input to the permutation rearrangement unit 502 is input to four four-input permutation rearrangement units 5020 on a 4-byte basis. The four four-input permutation rearrangement units 5020 each perform permutation rearrangement randomly using the 4-bit random numbers and output the results to four of the four-input permutation rearrangement units 5020, as illustrated in FIG. 6. Similarly, the rearrangement by the four four-input permutation rearrangement units 5020 is performed three times in total, whereby the permutation rearrangement unit 502 performs random permutation rearrangement on the mask value. In this process, since each of the four-input permutation rearrangement units 5020 uses 4-bit random numbers, the permutation rearrangement unit 502 uses 48-bit random numbers in total.

The operation unit 60 uses the rearranged sixteen mask values to mask each byte portion of data to be processed by the operation unit 60. As illustrated in FIG. 8, the mask values are rearranged in orders different for respective rounds. The second selection unit 50 selects the same sixteen sets of mask values and masked non-linear transformation tables until the table generation is completed and the index value i output by the table generation unit 20 changes. Then, the table generation unit 20 outputs the index value that is i=(i+1) mod 17, and the second selection unit 50 selects sixteen sets of mask values and masked non-linear transformation tables other than the ith mask value and the ith masked non-linear transformation table. For example, immediately after completion of the pre-processing, the mask values $m_0, \ldots, m_{15}$ and the masked non-linear transformation tables $Sm_0, \ldots, Sm_{15}$ are selected, and the encryption processing is performed. The encryption processing is performed until the generation of a next masked non-linear transformation table is completed. In a case where the rewriting is completed and the table generation unit 20 changes the index value to i=0, the second selection unit 50 selects the mask values $m_1, \ldots, m_{16}$ and the masked non-linear transformation tables $Sm_1, \ldots, Sm_{16}$ and outputs the selected mask values $m_1, \ldots, m_{16}$ and the selected masked non-linear transformation tables $Sm_1, \ldots, Sm_{16}$ to the operation unit 60. The foregoing operations are repeated while the encryption processing continues, whereby the combinations of mask values and masked non-linear transformation tables stored in the storage unit 40 are increased.

Figure 9:
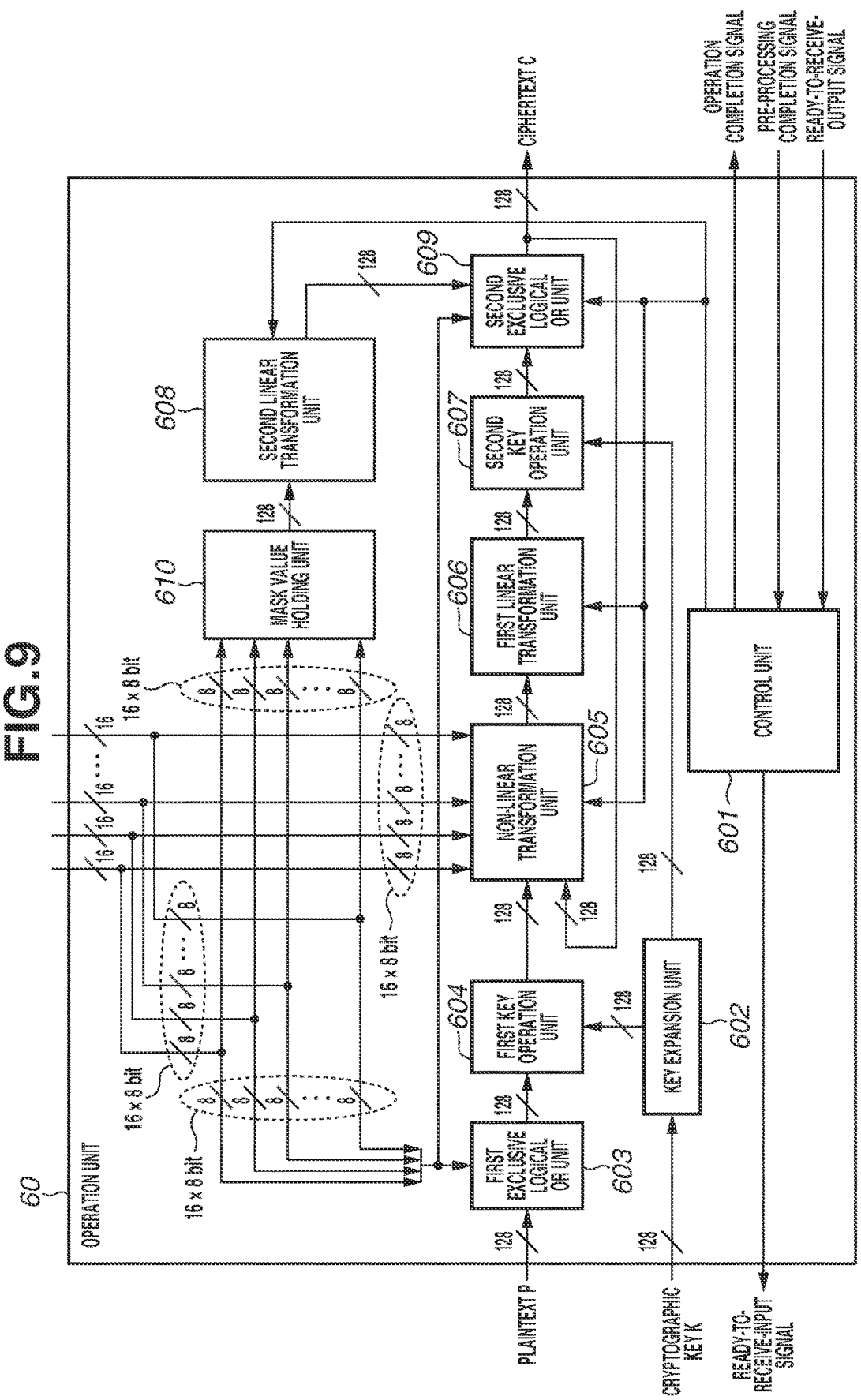
FIG. 9 is a diagram illustrating an example of a configuration of an operation unit.

Next, a process in the operation unit 60 will be described below. FIG. 9 illustrate an example of a configuration of the operation unit 60 according to the present exemplary embodiment. The operation unit 60 includes a control unit 601, a key expansion unit 602, a first exclusive logical OR unit 603, a first key operation unit 604, a non-linear transformation unit 605, a first linear transformation unit 606, a second key operation unit 607, and a second linear transformation unit 608. The operation unit 60 further includes a second exclusive logical OR unit 609 and a mask value holding unit 610.

In a case where a pre-processing completion signal is input to the control unit 601, the control unit 601 outputs a ready-to-receive-input signal for receiving an input from an external source outside the encryption processing apparatus 1. In a case where a plaintext P is input to the operation unit 60, the operation unit 60 starts the encryption processing. Once the encryption processing is started, the control unit 601 stops outputting a ready-to-receive-input signal and outputs the current round to the non-linear transformation unit 605, the first linear transformation unit 606, the second linear transformation unit 608, and the second exclusive logical OR unit 609. Further, after completion of the processing on the final round, the control unit 601 outputs an operation completion signal to external destinations outside the encryption processing apparatus 1 and to the table generation unit 20. In a case where the control unit 601 outputs an operation completion signal and a ready-to-receive-output signal indicating that an external source outside the encryption processing apparatus 1 is ready to receive an input of a ciphertext is input to the control unit 601, the control unit 601 outputs a ciphertext C to the external source outside the encryption processing apparatus 1. Further, after the ciphertext C is output to the external source outside the encryption processing apparatus 1, a ready-to-receive-input signal is output to external destinations outside the encryption processing apparatus 1. Further, in a case where another plaintext P is input, while the encryption processing is being performed, the outputting of operation completion signals and ready-to-receive-input signals is stopped.

The key expansion unit 602 generates a round key based on the cryptographic key K and outputs the generated round key to the first key operation unit 604 and the second key operation unit 607. The first exclusive logical OR unit 603 performs an exclusive logical OR between the plaintext P and the mask values selected by the second selection unit 50 to mask the plaintext P with the mask values and outputs the result to the first key operation unit 604. Next, the first key operation unit 604 performs AddRoundKey processing on the output of the first exclusive logical OR unit 603 and outputs the AddRoundKey processing result to the non-linear transformation unit 605.

The non-linear transformation unit 605 refers to the masked non-linear transformation tables selected by the second selection unit 50 and performs SubBytes processing on the input value. In this process, the masked non-linear transformation tables selected by the second selection unit 50 are tables corresponding to mask values added to the respective byte portions of the data by the first exclusive logical OR unit 603, and the non-linear transformation unit 605 performs a non-linear transformation on the input value and outputs a value with the mask value added thereto again. In a start round, the non-linear transformation unit 605 uses the result of the first key operation unit 604 as the input value, and from a round immediately following the start round, the non-linear transformation unit 605 uses the result of the second exclusive logical OR unit 609 as the input value.

Based on the result of the non-linear transformation unit 605, the first linear transformation unit 606 performs Shift-Rows processing and MixColumns processing from the start round to the penultimate round immediately before the final round, and in the final round, the first linear transformation unit 606 performs ShiftRows processing. Then, the first linear transformation unit 606 outputs the processing result to the second key operation unit 607. The mask value holding unit 610 holds the mask values selected by the second selection unit 50 during one round, and in a case where the round changes to the next round, the mask value holding unit 610 outputs the held mask values to the second linear transformation unit 608 and holds new mask values. Based on the output of the mask value holding unit 610, the second linear transformation unit 608 performs ShiftRows processing and MixColumns processing from the start round to the penultimate round immediately before the final round, and in the final round, the second linear transformation unit 608 performs ShiftRows processing based on the output of the mask value holding unit 610.

Then, the second linear transformation unit 608 outputs the processing result to the second exclusive logical OR unit 609.

The second key operation unit 607 performs AddRoundKey processing on the result of the first linear transformation unit 606 and outputs the AddRoundKey processing result to the second exclusive logical OR unit 609. The second exclusive logical OR unit 609 perform an exclusive logical OR between the result of the second key operation unit 607, the mask value, and the result of the second linear transformation unit 608. Then, in the rounds up to the penultimate round immediately before the final round, the second exclusive logical OR unit 609 outputs the exclusive logical OR result to the non-linear transformation unit 605, and in the final round, the second exclusive logical OR unit 609 outputs the exclusive logical OR result as a ciphertext C to the external source. The second exclusive logical OR unit 609 performs the exclusive logical OR on the result of the second linear transformation unit 608 to remove the mask value and performs the exclusive logical OR on the next mask value to mask the intermediate value. Only in the final round, the second exclusive logical OR unit 609 performs the exclusive logical OR only on the result of the second linear transformation unit 608, removes the mask value, and outputs the result as a ciphertext C.

Figure 10:
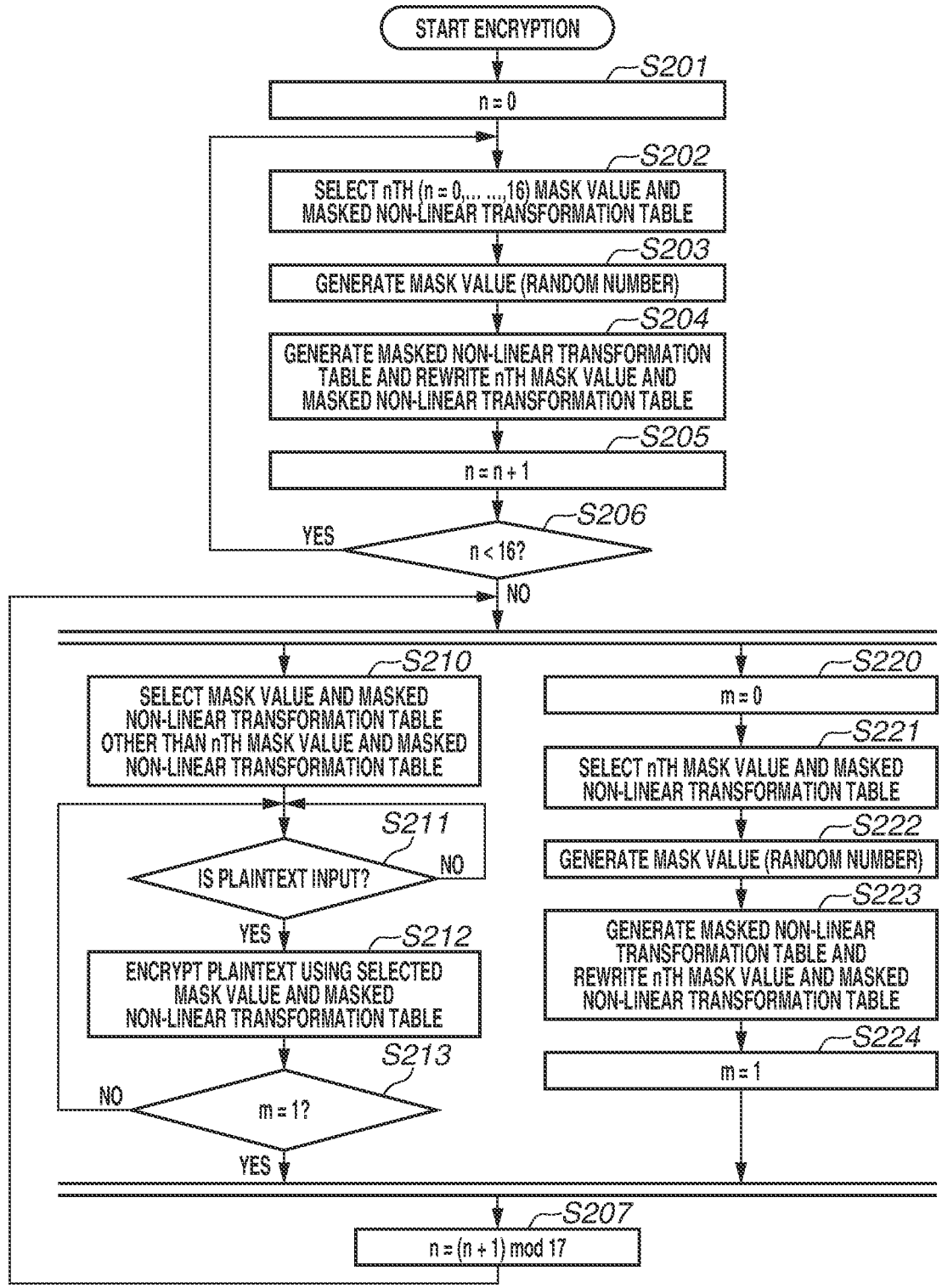
FIG. 10 is a flowchart illustrating encryption in an encryption processing method.

Next, a processing procedure of encryption processing of an encryption processing method for the encryption processing apparatus 1 according to the present exemplary embodiment will be described below with reference to FIG. 10. The encryption processing according to present exemplary embodiment consists of three processes that are pre-processing, which is performed at the time of starting the encryption processing, encryption processing, and masked non-linear transformation table generation processing.

Pre-Processing

In a case where the encryption is started, in step S201, the table generation unit 20 sets n=0. Then, in step S202, the first selection unit 30 selects the nth (n=0, . . . , 16) mask value and the nth masked non-linear transformation table. Next, in step S203, the random number generation unit 10 generates an 8-bit random number r as a mask value.

In step S204, the table generation unit 20 generates a masked non-linear transformation table based on the generated mask value and rewrites the nth mask value and the nth masked non-linear transformation table. After completion of the rewriting of the nth masked non-linear transformation table, in step S205, the table generation unit 20 sets n=n+1. In step S206, in a case where n<16 (YES in step S206), the processing returns to step S202. In step S202, a mask value and a masked non-linear transformation table are generated similarly. On the other hand, when steps S202 to S205 have been repeated sixteen times and in a case where n=16 in step S206 (NO in step S205), the pre-processing is completed, and then the encryption processing and the masked non-linear transformation table generation processing are performed concurrently.

Masked Non-Linear Transformation Table Generation Processing

In step S220, the table generation unit 20 sets m=0 to indicate that the masked non-linear transformation table generation is not completed. Then, in step S221, the first selection unit 30 selects the nth mask value and the nth masked non-linear transformation table. In step S222, the random number generation unit 10 generates an 8-bit random number r as a mask value. In step S223, as in the pre-processing, the table generation unit 20 generates a masked non-linear transformation table and rewrites the nth mask value and the nth masked non-linear transformation table. After completion of the rewriting of the nth mask value and the nth masked non-linear transformation table, in step S224, the table generation unit 20 sets m=1, and the masked non-linear transformation table generation processing is completed.

Encryption Processing

In step S210, the element selection unit 501 selects the mask values and the masked non-linear transformation tables other than the nth mask value and the nth masked non-linear transformation table. In step S211, the operation unit 60 waits until a plaintext P is input. In a case where a plaintext P is input (YES in step S211), the processing proceeds to step S212. In step S212, the operation unit 60 encrypts the plaintext P using the mask values and the masked non-linear transformation tables, other than the nth mask value and the nth masked non-linear transformation table, that are selected in step S210. After completion of the encryption, in step S213, in a case where m=0, i.e., the masked non-linear transformation table generation is not completed (NO in step S213), the processing returns to step S211 to wait until a plaintext P is input. On the other hand, in a case where m=1 and the masked non-linear transformation table generation is completed (YES in step S213), the operation unit 60 ends the encryption processing.

In a case where the encryption processing and the masked non-linear transformation table generation processing are both completed, in step S207, the table generation unit 20 sets n=(n+1) mod 17, and the encryption processing apparatus 1 performs the encryption processing and the masked non-linear transformation table generation again.

Figure 11A:
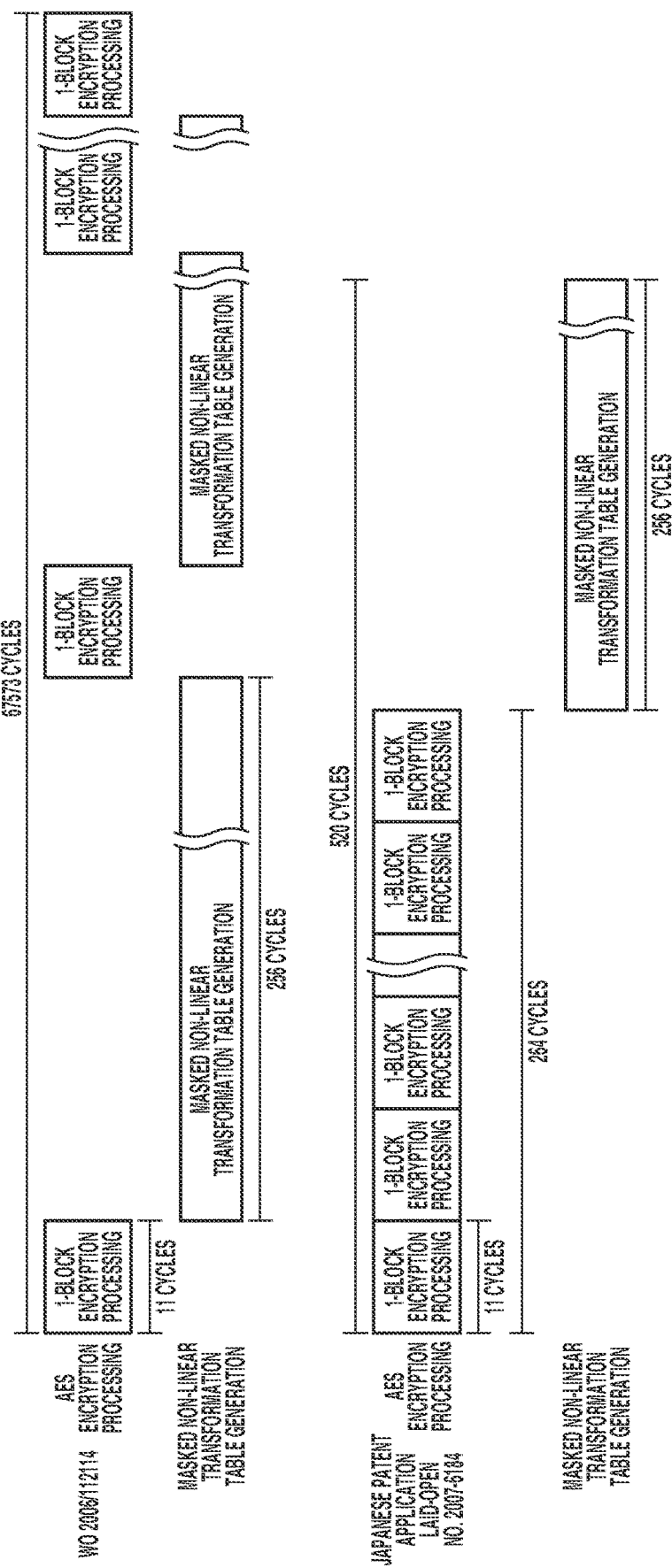
FIGS. 11A and 11B are timing charts each illustrating encryption processing apparatuses.
Figure 11B:
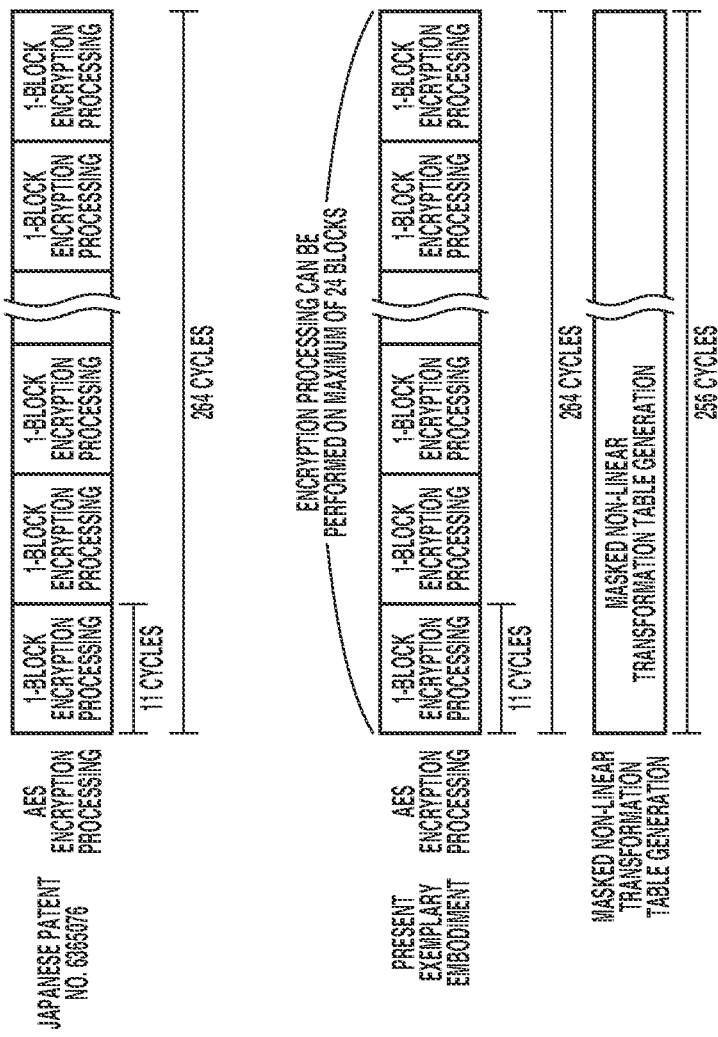

Next, an advantage of the present exemplary embodiment will be described below. FIGS. 11A and 11B are diagrams illustrating encryption processing timing charts according to WO 2006/112114, Japanese Patent Application Laid-Open No. 2007-6184, Japanese Patent No. 6365076, and the present exemplary embodiment, and effects on processing speed will be described below. In general, the AES encryption of a plaintext P processes 128 bits (1 block) in 11 cycles, and all of the techniques according to WO 2006/112114, Japanese Patent Application Laid-Open No. 2007-6184, Japanese Patent No. 6365076, and the present exemplary embodiment process encryption in 11 cycles.

According to WO 2006/112114 and Japanese Patent Application Laid-Open No. 2007-6184, the encryption processing and the masked non-linear transformation table generation processing are performed sequentially, and this causes a decrease in processing speed. In the example of WO 2006/112114 in FIG. 11, the encryption processing is performed on one block, and thereafter the 256-cycle masked non-linear transformation table generation processing is performed. Thus, the processing speed decreases significantly. For example, 67573 cycles are used to process 24 blocks.

Further, according to Japanese Patent Application Laid-Open No. 2007-6184, in a case where a data generation instruction is input for encryption of every 24 blocks and a masked non-linear transformation table is generated, the masked non-linear transformation table is updated as frequently as in the present exemplary embodiment. After the encryption processing on 24 blocks is performed in 264 cycles, a data generation instruction is input, and a new masked non-linear transformation table is generated in 256 cycles, which means that a total of 520 cycles is used.

On the contrary, according to Japanese Patent No. 6365076, since no masked non-linear transformation table generation processing is performed, the encryption of 24 blocks is performed in 264 cycles, which is the same as the processing speed of 264 cycles necessary for encrypting 24 blocks of a case where no countermeasures against side-channel attacks are implemented.

According to the present exemplary embodiment, as in WO 2006/112114 and Japanese Patent Application Laid-Open No. 2007-6184, the table generation unit 20 generates a single new masked non-linear transformation table over 256 cycles. Since the storage unit 40 stores the masked non-linear transformation table to which the operation unit 60 refers and the masked non-linear transformation table that the table generation unit 20 rewrites, the encryption processing and the masked non-linear transformation table generation processing are able to be performed concurrently. In the examples illustrated in FIG. 11B, the masked non-linear transformation table is rewritten during the 264 cycles in which the encryption of 24 blocks is performed. Thus, according to the present embodiment, the encryption of 24 blocks is performed in 264 cycles, which is the same as the processing speed of 264 cycles necessary for encrypting 24 blocks of a case where no countermeasures against side-channel attacks are implemented.

Further, the pre-processing is to be performed only once at the time of activating the encryption processing apparatus 1, and in a case where a large number of plaintexts P are encrypted, effects of the pre-processing on the processing speed is able to be largely disregarded. This makes it possible to apply the masking method with minimal decrease in processing speed, compared to a case where no countermeasures against side-channel attacks are implemented.

Next, effects on circuit size will be described below. In the cases where no countermeasures against side-channel attacks are implemented, a 4 k-byte read-only memory (4 k-byte ROM) is used for non-linear transformation tables. The present exemplary embodiment, on the other hand, can be implemented with a random access memory (RAM) of 4 k bytes+256 bytes for the storage unit 40 and a read-only memory (ROM) of 256 bytes for an initial non-linear transformation table, which means that the masking method is able to be applied without causing a significant increase in circuit size.

Next, effects on resistance to side-channel attacks will be described below. According to Japanese Patent No. 6365076, the mask values are fixed values, and this is the cause of decrease in resistance to side-channel attacks, compared to a case where mask values are variable. According to the present exemplary embodiment, on the other hand, since one of the mask values to be used is changed each time the encryption of 24 blocks is performed, the more the encryption processing is performed, the more the types of mask values for use increase. Side-channel attacks need many pieces of data on power consumption waveforms and electromagnetic waveforms in the encryption processing. According to the present exemplary embodiment, the more the encryption processing is performed while a side-channel attack collects data, the more the types of mask values increase. Consequently, the resistance to side-channel attacks is improved.

As described above, the random number generation unit 10 in FIG. 4 generates a random number. The table generation unit 20 generates a masked non-linear transformation table using the random number as a mask value. The storage unit 40 stores the mask value and the masked non-linear transformation table. The first selection unit 30 selects one set of a mask value and a masked non-linear transformation table that are to be rewritten from the mask values and the masked non-linear transformation tables that are stored in the storage unit 40. The operation unit 60 performs operations using the mask values and the masked transformation tables. The second selection unit 50 selects the mask values and the masked non-linear transformation tables that are to be used by the operation unit 60, from among the mask values and the masked non-linear transformation tables that have been stored in the storage unit 40.

The storage unit 40 stores one or more mask values in addition to the number of mask values to be used by the operation unit 60 and stores one or more masked non-linear transformation tables in addition to the number of masked non-linear transformation tables to be used by the operation unit 60. The first selection unit 30 and the second selection unit 50 select different mask values and different masked transformation tables. As illustrated in FIG. 10, the masked non-linear transformation table generation by the table generation unit 20 and the operation by the operation unit 60 are processed concurrently. After completion of the rewriting of the storage unit 40, the first selection unit 30 and the second selection unit 50 select mask values and masked non-linear transformation tables that are different from the rewritten mask value and the rewritten masked non-linear transformation table.

The encryption processing apparatus 1 in FIG. 4 processes a block cipher. The encryption processing apparatus 1 processes algorithms such as AES, DES, or SM4. In AES, the number of masked non-linear transformation tables to be used by the operation unit 60 is 16. In DES, the number of masked non-linear transformation tables to be used by the operation unit 60 is 8. In SM4, the number of masked non-linear transformation tables to be used by the operation unit 60 is 4.

In FIG. 9, the operation unit 60 encrypts a plaintext using mask values and masked transformation tables and generates a ciphertext. In the encryption in FIG. 9, the control unit 601 performs control. The key expansion unit 602 generates a round key based on a cryptographic key. The mask value holding unit 610 holds the mask values. The first exclusive logical OR unit 603 performs an exclusive logical OR between the mask values stored in the storage unit 40 and the plaintext. The first key operation unit 604 performs an operation using the output of the first exclusive logical OR unit 603 and the round key.

The non-linear transformation unit 605 performs a non-linear transformation on the input by referring to the masked non-linear transformation tables. The first linear transformation unit 606 performs a linear transformation on the output of the non-linear transformation unit 605. The second key operation unit 607 performs an operation using the output of the first linear transformation unit 606 and the round key. The second linear transformation unit 608 performs a linear transformation on the mask values held by the mask value holding unit 610. The second exclusive logical OR unit 609 performs an exclusive logical OR between the output of the second key operation unit 607, the output of the second linear transformation unit 608, and the mask values stored in the storage unit 40.

Next, a case of AES encryption will be described below. The first linear transformation unit 606 performs ShiftRows processing and MixColumns processing from the start round to the penultimate round immediately before the final round, and in the final round, the first linear transformation unit 606 performs ShiftRows processing. The second linear transformation unit 608 performs ShiftRows processing and MixColumns processing from the start round to the penultimate round immediately before the final round, and in the final round, the second linear transformation unit 608 performs ShiftRows processing. The first key operation unit 604 performs AddRoundKey processing. The second key operation unit 607 performs AddRoundKey processing. The non-linear transformation unit 605 performs SubBytes processing using the output of the first key operation unit 604 as input in the start round, and from the round immediately following the start round, the non-linear transformation unit 605 performs SubBytes processing using the output of the second exclusive logical OR unit 609 as input.

As described above, according to the present exemplary embodiment, the encryption processing apparatus 1 generates a masked non-linear transformation table concurrently with the encryption processing. This increases the types of mask values and masked non-linear transformation tables to be used without causing a decrease in processing speed while an increase in circuit size is minimized, whereby the resistance to side-channel attacks improves.

A second exemplary embodiment will be described below with reference to the drawings. It is to be noted that the same reference numeral is given to those having the same function in the drawings that are referred to in describing the present exemplary embodiment, and the redundant descriptions are omitted.

First, an overview of AES decryption processing will be described below. While a case where an AES key length is 128 bits will be described below, any of the key lengths of 128, 192, and 256 bits supported by AES may be used.

Figure 12:
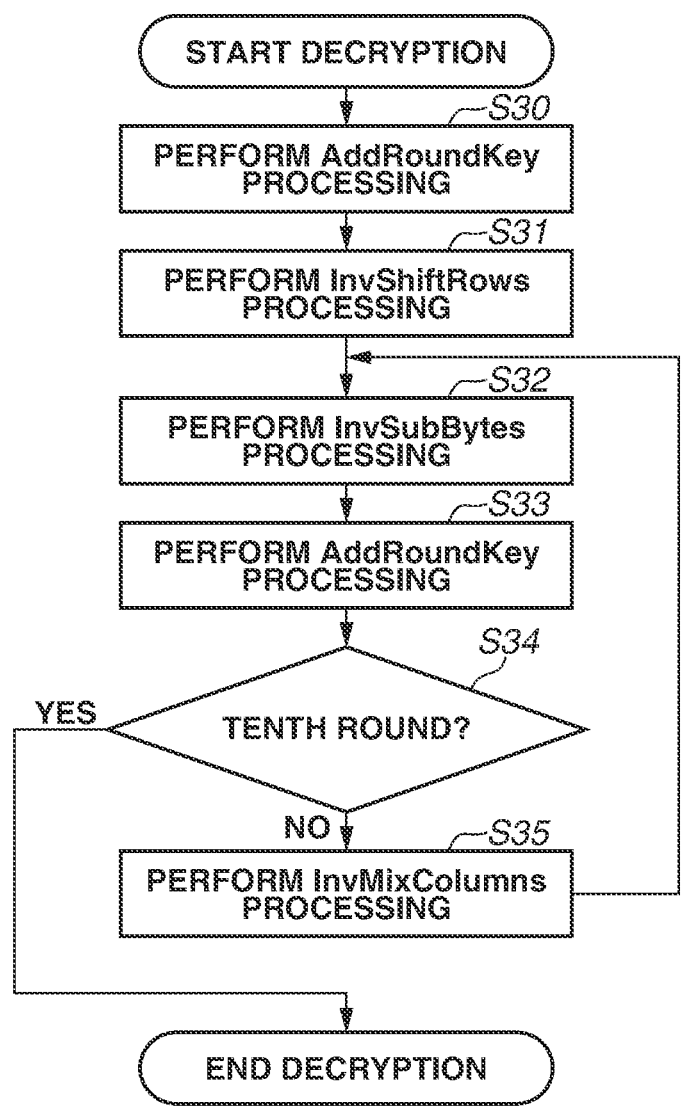
FIG. 12 is a flowchart illustrating an AES decryption process defined in FIPS.

FIG. 12 is a flowchart illustrating an AES decryption process. InvSubBytes processing, InvShiftRows processing, and InvMixColumns processing in FIG. 12 correspond to those of the same names that are defined as sub-block operations in "FIPS 197". InvSubBytes processing is the processing of performing a transformation that is the inverse of SubBytes processing according to the first exemplary embodiment. InvShiftRows processing is the processing of performing a transformation that is the inverse of ShiftRows processing according to the first exemplary embodiment. InvMixColumns processing is the processing of performing a transformation that is the inverse of MixColumns processing according to the first exemplary embodiment. Further, InvSubBytes processing is performed often using table transformation with a non-linear transformation table as in SubBytes processing. The non-linear transformation table is a table indicating a correspondence relationship between input 8 bits and output 8 bits and consists of 8 bits×256 elements.

In a case where the decryption is started, in step S30, AddRoundKey processing is performed. In step S31, InvShiftRows processing is performed based on the AddRoundKey processing result. In step S32, InvSubBytes processing is performed. In step S33, AddRoundKey processing is performed on the InvSubBytes processing result. Then, in step S34, determination of whether the AES round is the tenth round is performed. As a result of the determination, in a case where the AES round is the first to ninth round (NO in step S34), the processing proceeds to step S35. In step S35, InvMixColumns processing is performed, and then the processing returns to step S32. On the other hand, in step S34, in a case where the AES round is the tenth round (YES in step S34), the AddRoundKey processing result is output as a plaintext, and the decryption is ended.

A configuration of the encryption processing apparatus 1 according to the second exemplary embodiment is similar to that according to the first exemplary embodiment and is illustrated in FIG. 4. The encryption processing apparatus 1 includes the random number generation unit 10, the table generation unit 20, the first selection unit 30, the storage unit 40, the second selection unit 50, and the operation unit 60. The encryption processing apparatus 1 outputs a plaintext P based on an input ciphertext C and a cryptographic key K. A ciphertext C is input only in a case where a ready-to-receive-input signal is output from the encryption processing apparatus 1. The encryption processing apparatus 1 according to the present exemplary embodiment is different from the encryption processing apparatus 1 according to the first exemplary embodiment in that the functions of the table generation unit 20 and the operation unit 60 are different. Units having a different function and added units will be described below.

A standard processing procedure of decryption processing in the encryption processing apparatus 1 will be described below. The decryption processing includes three processes that are pre-processing, which is performed at the time of activating the encryption processing apparatus 1, decryption processing, and masked non-linear transformation table generation processing. The decryption processing and the masked non-linear transformation table generation processing are performed concurrently after completion of the pre-processing.

Pre-Processing

A processing procedure of the pre-processing in the encryption processing apparatus 1 will be described below. In the pre-processing, the table generation unit 20 generates the number of mask values to be used by the operation unit 60 and the number of masked non-linear transformation tables to be used by the operation unit 60 and stores the generated mask values and the generated masked non-linear transformation tables in the storage unit 40. For example, in AES, sixteen mask values and sixteen masked non-linear transformation tables are generated.

First, the random number generation unit 10 generates an 8-bit random number r and inputs the generated random number r as a mask value to the table generation unit 20. The table generation unit 20 holds an initial non-linear transformation table generated by tabulating InvSubBytes input/output results defined in "FIPS 197". The table generation unit 20 generates array data $ISm[0], \ldots, ISm[255]$ of a masked non-linear transformation table as described below, based on the mask value and array data $IS[0], \ldots, IS[255]$ of the initial non-linear transformation table.

$$ISm[x]=IS[x+r]+r \ (x=0,1,\ldots,255).$$

The generated mask value and the generated masked non-linear transformation table are output to the first selection unit 30 and stored in the storage unit 40 via the first selection unit 30. The table generation unit 20 generates an index value i indicating a number for a mask value and a masked non-linear transformation table that are stored in the storage unit 40, and outputs the generated index value i to the first selection unit 30 and the second selection unit 50. Thereafter, the table generation unit 20 rewrites a mask value and a masked non-linear transformation table in the storage unit 40 that are selected by the first selection unit 30. At the time of starting the pre-processing, the table generation unit 20 outputs an index value that is i=0, and thus, the first selection unit 30 selects the mask value $m_0$ and the masked non-linear transformation table $ISm_0$. After completion of the rewriting of the selected mask value $m_0$ and the selected masked non-linear transformation table $ISm_0$, the table generation unit 20 outputs an index value that is i=i+1 to the first selection unit 30 and starts generating a next masked non-linear transformation table.

Then, by a process similar the above described process, the table generation unit 20 generates a masked non-linear transformation table and rewrites a mask value and a masked non-linear transformation table that are selected by the first selection unit 30 based on the index value i. The table generation unit 20 repeats the foregoing operations and stores, in the storage unit 40, sixteen mask values and sixteen masked non-linear transformation tables that are to be used by the operation unit 60 to perform AES operations. Then, the table generation unit 20 sets i=i+1=16, outputs a pre-processing completion signal to the operation unit 60, and ends the pre-processing. Specifically, the mask values $m_0, \ldots, m_{15}$ and the masked non-linear transformation tables $ISm_0, \ldots, ISm_{15}$ are sequentially stored in the storage unit 40, and the pre-processing is completed.

Masked Non-Linear Transformation Table Generation Processing

A processing procedure of the masked non-linear transformation table generation processing in the encryption processing apparatus 1 will be described below. The masked non-linear transformation table generation processing is performed after completion of the pre-processing, and is processed concurrently with the decryption processing.

After completion of the pre-processing, as in the pre-processing, the table generation unit 20 generates a new masked non-linear transformation table using an 8-bit random number r generated by the random number generation unit 10 as a mask value. Immediately after completion of the pre-processing, the index value is i=16, and thus, the first selection unit 30 selects the sixteenth mask value $m_{16}$ and the sixteenth masked non-linear transformation table $ISm_{16}$. In a case where the rewriting of the mask value $m_{16}$ and the masked non-linear transformation table $ISm_{16}$ is completed and the decryption processing by the operation unit 60 is completed, the table generation unit 20 sets i=(i+1) mod 17.

Then, the table generation unit 20 starts generating a new mask value and a new masked non-linear transformation table. The table generation unit 20 generates a masked non-linear transformation table using an 8-bit random number r generated by the random number generation unit 10 as a mask value. The first selection unit 30 selects the mask value $m_i$ and the masked non-linear transformation table $ISm_i$ based on the index value i output by the table generation unit 20. In a case where the rewriting of the mask value $m_i$ and the masked non-linear transformation table $ISm_i$ is completed and an operation completion signal is received from the operation unit 60, the table generation unit 20 sets the index value to i=(i+1) mod 17.

Specifically, immediately after completion of the pre-processing, the index value is i=16, and thus, the first selection unit 30 selects the mask value $m_{16}$ and the masked non-linear transformation table $ISm_{16}$. After completion of the rewriting of the masked non-linear transformation table $ISm_{16}$, the index value i is changed to 0, and thus, the first selection unit 30 selects the mask value $m_0$ and the masked non-linear transformation table $ISm_0$, and the table generation unit 20 starts the masked non-linear transformation table generation. By repeating the foregoing operations, the mask values and the masked non-linear transformation tables are rewritten sequentially, and the more the decryption processing is performed, the more the types of mask values and masked non-linear transformation tables to be used by the operation unit 60 increase.

Decryption Processing

Next, a processing procedure of the decryption processing in the encryption processing apparatus 1 will be described below. The decryption processing is performed after completion of the pre-processing, and is processed concurrently with the masked non-linear transformation table generation processing. In the decryption processing, the operation unit 60 outputs a plaintext P based on the input ciphertext C, the cryptographic key K, and the mask values and the masked non-linear transformation tables that are stored in the storage unit 40.

Figure 13:
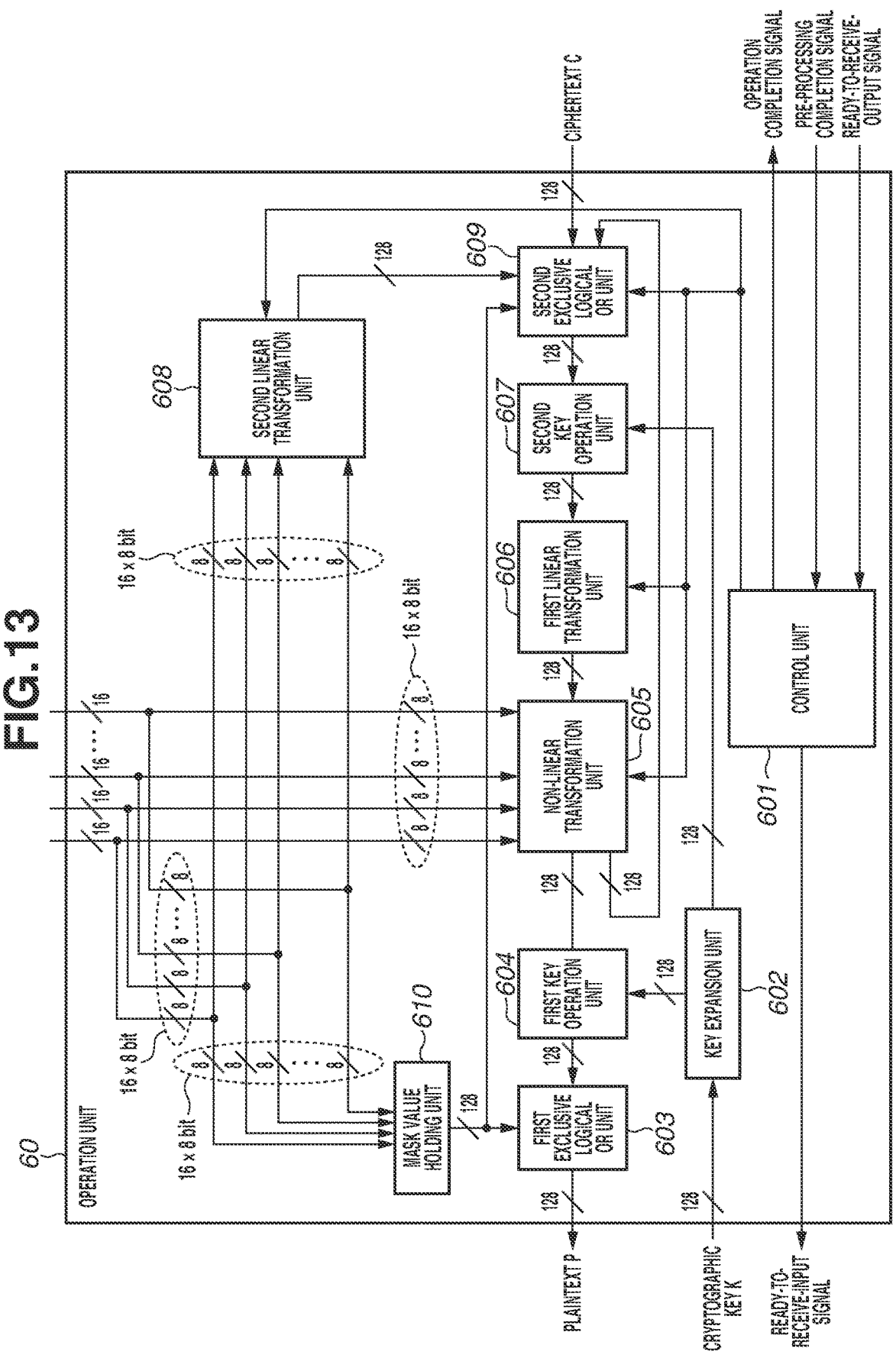
FIG. 13 is a diagram illustrating an example of a configuration of an operation unit.

The processing in the operation unit 60 will be described below. FIG. 13 illustrates an example of a configuration of the operation unit 60 according to the present exemplary embodiment. The operation unit 60 includes the control unit 601, the key expansion unit 602, the first exclusive logical OR unit 603, the first key operation unit 604, the non-linear transformation unit 605, the first linear transformation unit 606, and the second key operation unit 607. The operation unit 60 further includes the second linear transformation unit 608, the second exclusive logical OR unit 609, and the mask value holding unit 610. The operation unit 60 according to the present exemplary embodiment is different from the operation unit 60 according to the first exemplary embodiment in that the processing procedure, the processing performed by the non-linear transformation unit 605, the processing performed by the first linear transformation unit 606, the processing performed by the second linear transformation unit 608, and the position of the mask value holding unit 610 are different.

In a case where a pre-processing completion signal is input to the control unit 601, the control unit 601 outputs a ready-to-receive-input signal to external destinations outside the encryption processing apparatus 1. In a case where a ciphertext C is input, the operation unit 60 starts the decryption processing. Once the decryption processing is started, the control unit 601 stops outputting a ready-to-receive-input signal and outputs the current round to the non-linear transformation unit 605, the first linear transformation unit 606, the second linear transformation unit 608, and the second exclusive logical OR unit 609. After completion of the processing on the final round, the control unit 601 outputs an operation completion signal to the table generation unit 20 and external destinations outside the encryption processing apparatus 1. In a case where the control unit 601 outputs an operation completion signal and a ready-to-receive-output signal indicating that an external source outside the encryption processing apparatus 1 is ready to receive an input of a plaintext is input from the external source to the control unit 601, the control unit 601 outputs a plaintext P to the external source outside the encryption processing apparatus 1. After outputting of the plaintext P to the external source outside the encryption processing apparatus 1, the control unit 601 outputs a ready-to-receive-input signal to external destinations outside the encryption processing apparatus 1. In a case where another plaintext P is input, the control unit 601 does not output ready-to-receive-input signals and operation completion signals while the decryption processing is being performed.

The key expansion unit 602 generates a round key based on the cryptographic key K and outputs the generated round key to the first key operation unit 604 and the second key operation unit 607. The second linear transformation unit 608 performs InvShiftRows processing on the mask values selected by the second selection unit 50 in the start round, and from the second round to the final round (i.e., penultimate round), the second linear transformation unit 608 performs InvShiftRows processing and InvMixColumns processing.

The mask value holding unit 610 holds the mask values selected by the second selection unit 50 during one round, and in the next round, the mask value holding unit 610 outputs the held mask values to the first exclusive logical OR unit 603 and the second exclusive logical OR unit 609. The second exclusive logical OR unit 609 calculates an exclusive logical OR between the input, the output of the second linear transformation unit 608, and the mask values held by the mask value holding unit 610, and outputs the calculated exclusive logical OR to the second key operation unit 607. The second exclusive logical OR unit 609 receives the current round from the control unit 601, and in a case where the current round is the start round, the ciphertext C is used as input, whereas in a case where the current round is one of the second round to the final round (i.e., penultimate round), the output of the non-linear transformation unit 605 is selected as input.

The second key operation unit 607 performs AddRoundKey processing on the output of the second exclusive logical OR unit 609 and outputs the AddRoundKey processing result to the first linear transformation unit 606. The first linear transformation unit 606 performs InvShiftRows processing on the output of the second key operation unit 607 and outputs the result in the start round, and from the second round to the final round, the first linear transformation unit 606 performs InvShiftRows processing and InvMixColumns processing on the output of the second key operation unit 607 and outputs the result.

The non-linear transformation unit 605 refers to the masked non-linear transformation tables selected by the second selection unit 50 and performs InvSubBytes processing on the input value. In this processing, tables corresponding to mask values added to the respective byte portions of the data by the second exclusive logical OR unit 609 is selected from among the masked non-linear transformation tables selected by the second selection unit 50, and the non-linear transformation unit 605 performs a non-linear transformation on the input value and outputs a value with the mask value added thereto again. In the first round to the penultimate round immediately before the last round, the non-linear transformation unit 605 outputs the result to the second exclusive logical OR unit 609, and in the last round, the non-linear transformation unit 605 outputs the result to the first key operation unit 604.

The first key operation unit 604 performs AddRoundKey processing on the output of the non-linear transformation unit 605 and outputs the AddRoundKey processing result to the first exclusive logical OR unit 603. The first exclusive logical OR unit 603 calculates an exclusive logical OR between the output of the first key operation unit 604 and the mask values held by the mask value holding unit 610 and outputs the calculated exclusive logical OR as a plaintext P to the external destination outside the encryption processing apparatus 1.

Figure 14:
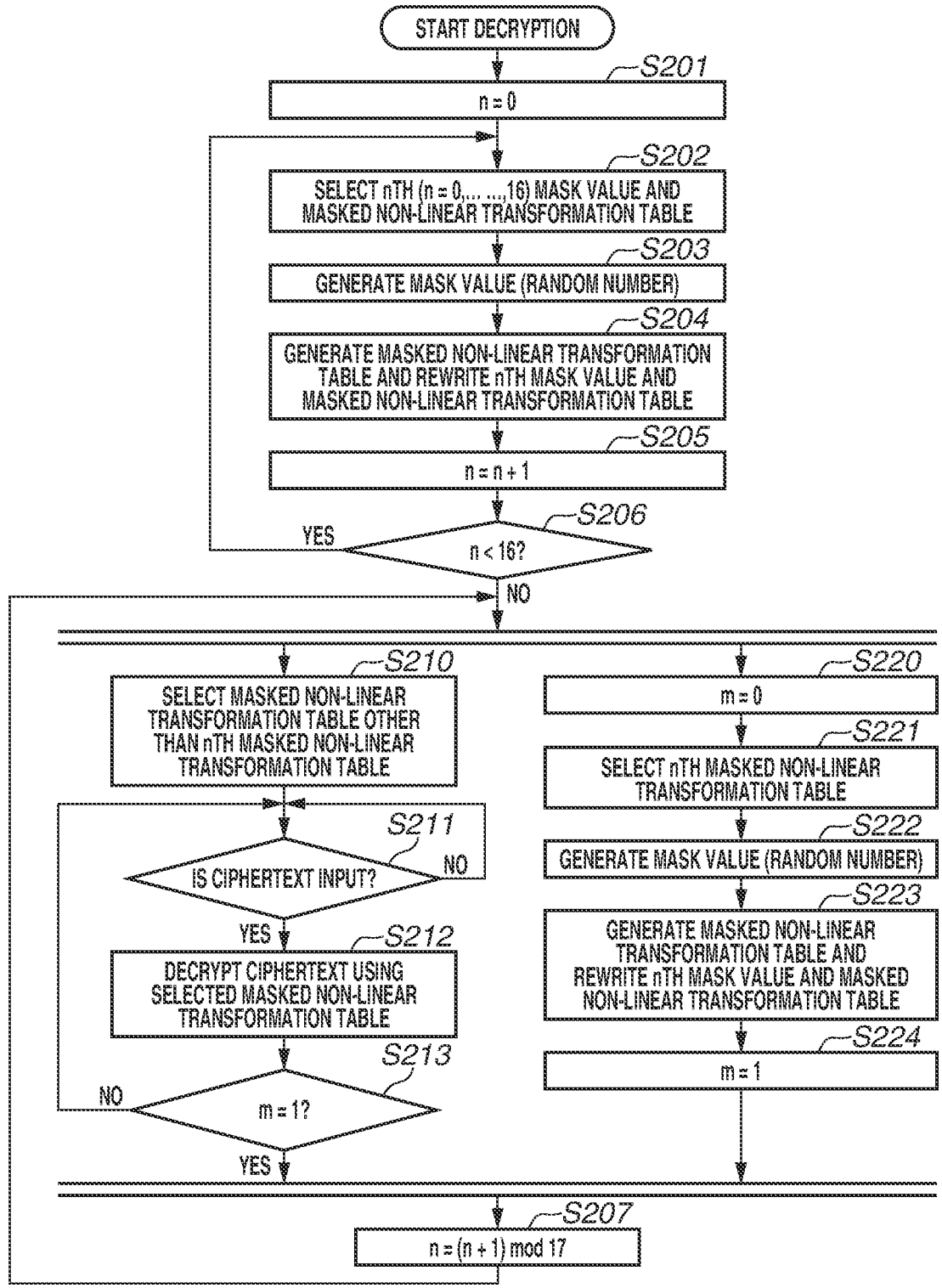
FIG. 14 is a flowchart illustrating decryption in an encryption processing method.

Next, a processing procedure of decryption processing of an encryption processing method for the encryption processing apparatus 1 according to the second exemplary embodiment will be described below with reference to FIG. 14. The decryption processing according to the second exemplary embodiment includes three processes that are pre-processing, which is performed at the time of starting decryption processing, decryption processing, and masked non-linear transformation table generation processing. Steps S202 and S204 of the pre-processing, steps S210, S211, and S212 of the decryption processing, and steps S221 and S223 of the masked non-linear transformation table generation processing are different from those of the encryption processing according to the first exemplary embodiment. Differences between FIG. 14 and FIG. 10 will be described below.

Pre-Processing

In the pre-processing, in step S202, the first selection unit 30 selects the nth mask value and the nth masked non-linear transformation table. In step S203, the random number generation unit 10 generates an 8-bit random number r as a mask value. In step S204, the table generation unit 20 generates a masked non-linear transformation table based on the generated mask value and rewrites the nth mask value and the nth masked non-linear transformation table. Then, as in the first exemplary embodiment, the table generation unit 20 repeats steps S202 to S205 sixteen times. In step S206, in a case where n=16 (NO in step S206), the pre-processing is completed. Then, the decryption processing and the masked non-linear transformation table generation processing described below are performed concurrently.

Masked Non-Linear Transformation Table Generation Processing

In step S220, the table generation unit 20 sets m=0 to indicate that the masked non-linear transformation table generation is not completed. Then, in step S221, the first selection unit 30 selects the nth masked non-linear transformation table. In step S222, the random number generation unit 10 generates an 8-bit random number r as a mask value. In step S223, the table generation unit 20 generates a masked non-linear transformation table as in the pre-processing and rewrites the nth mask value and the nth masked non-linear transformation table. After completion of the rewriting of the nth mask value and the nth masked non-linear transformation table, in step S224, the table generation unit 20 sets m=1, and the masked non-linear transformation table generation processing is completed.

Decryption Processing

In step S210, the element selection unit 501 selects the masked non-linear transformation tables other than the nth masked non-linear transformation table. In step S211, the operation unit 60 waits until a ciphertext C is input. In a case where a ciphertext C is input (YES in step S211), the processing proceeds to step S212. In step S212, the operation unit 60 decrypts the ciphertext C using the masked non-linear transformation tables other than the nth masked non-linear transformation table that are selected in step S210. After completion of the decryption, in step S213, in a case where m=0, i.e., the masked non-linear transformation table generation is not completed (NO in step S213), the processing returns to step S211, and the operation unit 60 waits until a ciphertext C is input. On the other hand, in a case where m=1 and the masked non-linear transformation table generation is completed (YES in step S213), the operation unit 60 ends the decryption processing.

In a case where the decryption processing and the masked non-linear transformation table generation processing are both completed, in step S207, the table generation unit 20 sets n=(n+1) mod 17, and the decryption processing and the masked non-linear transformation table generation are performed again.

An advantage of the decryption processing according to the present exemplary embodiment is similar to the advantage of the encryption processing according to the first exemplary embodiment, and the redundant descriptions are omitted.

As described above, in FIG. 13, the operation unit 60 decrypts a ciphertext using mask values and masked transformation tables and generates a plaintext. In the decryption in FIG. 13, the control unit 601 performs control. The key expansion unit 602 generates a round key based on the cryptographic key. The second linear transformation unit 608 performs a linear transformation on the mask values. The mask value holding unit 610 holds the mask values. The second exclusive logical OR unit 609 performs an exclusive logical OR between the input, the mask values held by the mask value holding unit 610, and the output of the second linear transformation unit 608. The second key operation unit 607 performs an operation using the output of the second exclusive logical OR unit 609 and the round key. The first linear transformation unit 606 performs a linear transformation on the output of the second key operation unit 607.

The non-linear transformation unit 605 performs a non-linear transformation on the output of the first linear transformation unit 606 by referring to the masked non-linear transformation tables. The first key operation unit 604 performs an operation using the output of the non-linear transformation unit 605 and the round key. The first exclusive logical OR unit 603 performs an exclusive logical OR between the output of the first key operation unit 604 and the mask values held by the mask value holding unit 610.

Next, a case of AES decryption will be described below. The second exclusive logical OR unit 609 uses a ciphertext as input in the start round, and from the round immediately following the start round, the second exclusive logical OR unit 609 uses the output of the non-linear transformation unit 605 as input. The first linear transformation unit 606 performs InvShiftRows processing in the start round, and from the round immediately following the start round, the first linear transformation unit 606 performs InvShiftRows processing and InvMixColumns processing. The second linear transformation unit 608 performs InvShiftRows processing in the start round, and from the round immediately following the start round, the second linear transformation unit 608 performs InvShiftRows processing and InvMixColumns processing. The second key operation unit 607 performs AddRoundKey processing. The first key operation unit 604 performs AddRoundKey processing. The non-linear transformation unit 605 performs InvSubBytes processing.

As described above, according to the present exemplary embodiment, the encryption processing apparatus 1 generates a masked non-linear transformation table concurrently with the decryption processing. This increases the types of mask values and masked non-linear transformation tables to be used without causing a decrease in processing speed while an increase in circuit size is minimized, whereby the resistance to side-channel attacks improves.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

It is to be noted that the above-described exemplary embodiments are merely specific examples of implementation of the present disclosure and are not intended to limit interpretation of the technical scope of the present disclosure. Specifically, the present disclosure can be implemented in various forms without departing from the technical concept or major features of the present disclosure.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-159284, filed Oct. 3, 2022, which is hereby incorporated by reference herein in its entirety.

What is claimed is:

1. An encryption processing apparatus comprising:
   a random number generation unit configured to generate a random number;
   a table generation unit configured to generate a masked non-linear transformation table using the random number as a mask value;
   a storage unit configured to store the mask value and the masked non-linear transformation table;
   a first selection unit configured to select, from among the mask value and the masked non-linear transformation table that are stored in the storage unit, one set of a mask value and a masked non-linear transformation table that are to be rewritten;
   an operation unit configured to perform an operation using the mask value and the masked non-linear transformation table; and
   a second selection unit configured to select, from among the mask value and the masked non-linear transformation table that are stored in the storage unit, the mask value and the masked non-linear transformation table that are to be used by the operation unit,
   wherein the storage unit stores one or more mask values in addition to a number of the mask values to be used by the operation unit and stores one or more masked non-linear transformation tables in addition to a number of masked non-linear transformation tables to be used by the operation unit,
   wherein the mask value and the masked non-linear transformation table that the first selection unit selects and the mask value and the masked non-linear transformation table that the second selection unit selects are different from each other,
   wherein the generation of the masked non-linear transformation table by the table generation unit and the operation by the operation unit are processed concurrently, and
   wherein, after completion of the rewriting of the storage unit, the first selection unit and the second selection unit select the mask value and the masked non-linear transformation table that are different from the rewritten mask value and the rewritten masked non-linear transformation table.

2. The encryption processing apparatus according to claim 1, wherein the operation unit encrypts a plaintext using the mask value and the masked non-linear transformation table and generates a ciphertext.

3. The encryption processing apparatus according to claim 1, wherein the operation unit decrypts a ciphertext using the mask value and the masked non-linear transformation table and generates a plaintext.

4. The encryption processing apparatus according to claim 1, wherein the encryption processing apparatus processes a block cipher.

5. The encryption processing apparatus according to claim 4, wherein an algorithm supported by the encryption processing apparatus is the Advanced Encryption Standard (AES), the Data Encryption Standard (DES), or the ShangMi 4 (SM4).

6. The encryption processing apparatus according to claim 5, wherein the operation unit includes:
   a control unit configured to perform control;
   a key expansion unit configured to generate a round key based on a cryptographic key;
   a mask value holding unit configured to hold a mask value;
   a first exclusive logical OR unit configured to perform an exclusive logical OR between the mask value stored in the storage unit and a plaintext;
   a first key operation unit configured to perform an operation using an output of the first exclusive logical OR unit and the round key;
   a non-linear transformation unit configured to perform a non-linear transformation on an input by referring to the masked non-linear transformation table;
   a first linear transformation unit configured to perform a linear transformation on an output of the non-linear transformation unit;
   a second key operation unit configured to perform an operation using an output of the first linear transformation unit and the round key;
   a second linear transformation unit configured to perform a linear transformation on the mask value held by the mask value holding unit; and
   a second exclusive logical OR unit configured to perform an exclusive logical OR between an output of the second key operation unit, an output of the second linear transformation unit, and the mask value stored in the storage unit.

7. The encryption processing apparatus according to claim 5, wherein in AES, the number of masked non-linear transformation tables to be used by the operation unit is 16.

8. The encryption processing apparatus according to claim 6,
   wherein the first linear transformation unit performs ShiftRows processing and MixColumns processing from a start round to a penultimate round immediately before a final round and performs ShiftRows processing in the final round,
   wherein the second linear transformation unit performs ShiftRows processing and MixColumns processing from the start round to the penultimate round immediately before the final round and performs ShiftRows processing in the final round,
   wherein the first key operation unit performs AddRoundKey processing,
   wherein the second key operation unit performs AddRoundKey processing, and
   wherein, in the start round, the non-linear transformation unit performs SubBytes processing using the output of the first key operation unit as an input, and from a round immediately following the start round, the non-linear transformation unit performs SubBytes processing using an output of the second exclusive logical OR unit as an input.

9. The encryption processing apparatus according to claim 5, wherein in decryption, the operation unit includes:
a control unit configured to perform control;
a key expansion unit configured to generate a round key based on a cryptographic key;
a second linear transformation unit configured to perform a linear transformation on a mask value;
a mask value holding unit configured to hold the mask value;
a second exclusive logical OR unit configured to perform an exclusive logical OR between an input, the mask value held by the mask value holding unit, and an output of the second linear transformation unit;
a second key operation unit configured to perform an operation using an output of the second exclusive logical OR unit and the round key;
a first linear transformation unit configured to perform a linear transformation on an output of the second key operation unit;
a non-linear transformation unit configured to perform a non-linear transformation on an output of the first linear transformation unit by referring to the masked non-linear transformation table;
a first key operation unit configured to perform an operation using an output of the non-linear transformation unit and the round key; and
a first exclusive logical OR unit configured to perform an exclusive logical OR between an output of the first key operation unit and the mask value held by the mask value holding unit.

10. The encryption processing apparatus according to claim 9, wherein, in AES decryption,
the second exclusive logical OR unit uses a ciphertext as input in a start round, and from a round immediately following the start round, the second exclusive logical OR unit uses an output of the non-linear transformation unit as an input,
the first linear transformation unit performs InvShiftRows processing in the start round, and from the round immediately following the start round, the first linear transformation unit performs InvShiftRows processing and InvMixColumns processing,
the second linear transformation unit performs InvShiftRows processing in the start round, and from the round immediately following the start round, the second linear transformation unit performs InvShiftRows processing and InvMixColumns processing,
the second key operation unit performs AddRoundKey processing,
the first key operation unit performs AddRoundKey processing, and
the non-linear transformation unit performs InvSubBytes processing.

11. The encryption processing apparatus according to claim 5, wherein in DES, the number of masked non-linear transformation tables to be used by the operation unit is 8.

12. The encryption processing apparatus according to claim 5, wherein in SM4, the number of masked non-linear transformation tables to be used by the operation unit is 4.

13. An encryption processing method for an encryption processing apparatus, the encryption processing method comprising:
generating a random number;
generating a masked non-linear transformation table using the random number as a mask value;
storing the mask value and the masked non-linear transformation table in a storage unit;
performing first selection to select, from among the mask value and the masked non-linear transformation table that are stored in the storage unit, one set of a mask value and a masked non-linear transformation table that are to be rewritten;
performing an operation using the mask value and the masked non-linear transformation table; and
performing second selection to select, from among the mask value and the masked non-linear transformation table that are stored in the storage unit, the mask value and the masked non-linear transformation table that are to be used by the operation,
wherein the storage unit stores one or more mask values in addition to a number of mask values to be used by the operation and stores one or more masked non-linear transformation tables in addition to a number of masked non-linear transformation tables to be used by the operation,
wherein the mask value and the masked non-linear transformation table that the first selection selects and the mask value and the masked non-linear transformation table that the second selection selects are different from each other,
wherein the table generation and the operation are processed concurrently, and
wherein, after completion of the rewriting of the storage unit, the first selection and the second selection select the mask value and the masked non-linear transformation table that are different from the rewritten mask value and the rewritten masked non-linear transformation table.

14. A non-transitory storage medium storing a program causing an encryption processing apparatus to execute an encryption processing method, the encryption processing method comprising:
generating a random number;
generating a masked non-linear transformation table using the random number as a mask value;
storing the mask value and the masked non-linear transformation table in a storage unit;
performing first selection to select, from among the mask value and the masked non-linear transformation table that are stored in the storage unit, one set of a mask value and a masked non-linear transformation table that are to be rewritten;
performing an operation using the mask value and the masked non-linear transformation table; and
performing second selection to select, from among the mask value and the masked non-linear transformation table that are stored in the storage unit, the mask value and the masked non-linear transformation table that are to be used by the operation,
wherein the storage unit stores one or more mask values in addition to a number of mask values to be used by the operation and stores one or more masked non-linear transformation tables in addition to a number of masked non-linear transformation tables to be used by the operation,
wherein the mask value and the masked non-linear transformation table that the first selection selects and the mask value and the masked non-linear transformation table that the second selection selects are different from each other, wherein the table generation and the operation are processed concurrently, and wherein, after completion of the rewriting of the storage unit, the first selection and the second selection select the mask value and the masked non-linear transformation table that are different from the rewritten mask value and the rewritten masked non-linear transformation table.

* * * * *